（12）United States Patent
Lee

(10) Patent No.: US 11,401,963 B2
(45) Date of Patent: Aug. 2, 2022

(54) FASTENER ASSEMBLY AND METHOD

(71) Applicant: ILLINOIS TOOL WORKS INC., Glenview, IL (US)

(72) Inventor: Joel R. Lee, Peotone, IL (US)

(73) Assignee: Illinois Tool Works Inc., Glenview, IL (US)

(*) Notice: Subject to any disclaimer, the term of this patent is extended or adjusted under 35 U.S.C. 154(b) by 233 days.

(21) Appl. No.: 16/523,045

(22) Filed: Jul. 26, 2019

(65) Prior Publication Data

US 2020/0032829 A1    Jan. 30, 2020

Related U.S. Application Data

(60) Provisional application No. 62/703,919, filed on Jul. 27, 2018.

(51) Int. Cl.
| | | |
|---|---|---|
| *F16B 19/10* | (2006.01) | |
| *F16B 21/07* | (2006.01) | |
| *F16B 21/08* | (2006.01) | |
| *F16B 21/12* | (2006.01) | |

(52) U.S. Cl.
CPC .......... *F16B 21/075* (2013.01); *F16B 21/086* (2013.01); *F16B 21/125* (2013.01)

(58) Field of Classification Search
CPC .. F15B 21/075; F15B 19/1081; F16B 21/075; F16B 19/1081
USPC ...................................................... 411/45–48
See application file for complete search history.

(56) References Cited

U.S. PATENT DOCUMENTS

| | | | |
|---|---|---|---|
| 4,927,287 A * | 5/1990 | Ohkawa | F16B 21/086 24/297 |
| 5,775,860 A | 7/1998 | Meyer | |
| 7,213,304 B2 | 5/2007 | Lubera et al. | |
| 7,267,361 B2 | 9/2007 | Hofmann et al. | |

(Continued)

FOREIGN PATENT DOCUMENTS

| | | |
|---|---|---|
| CN | 206175427 U | 5/2017 |
| CN | 108290528 A | 7/2018 |

(Continued)

OTHER PUBLICATIONS

International Search Report and Written Opinion of the International Searching Authority from corresponding PCT Application No. PCT/US2019/043653, dated Nov. 5, 2019 (14 pages).

*Primary Examiner* — Flemming Saether
(74) *Attorney, Agent, or Firm* — Quarles & Brady LLP

(57) ABSTRACT

A fastener assembly is provided. In one embodiment, the fastener assembly includes a panel fastener and a lock pin insertable into the panel fastener to a first position and a second position. The lock pin including a flexible arm configured to upon insertion of the lock pin into the panel fastener in a first direction to the first position, flex inwardly and then outwardly to bring an end surface of the flexible arm into engagement with a panel retention tab of the panel fastener. Upon insertion of the lock pin into the panel fastener in the first direction to the second position, the flexible arm is configured to flex inwardly to allow a retention tab to pass into the panel fastener to bring a retention surface of the lock pin into engagement with a first panel retention surface of the panel fastener.

20 Claims, 25 Drawing Sheets

(56) References Cited

U.S. PATENT DOCUMENTS

| | | | |
|---|---|---|---|
| 7,374,200 B2 * | 5/2008 | Ikeda | B60R 21/213 |
| | | | 280/728.2 |
| 7,841,817 B2 * | 11/2010 | Kawai | F16B 19/1081 |
| | | | 411/45 |
| 8,474,111 B2 | 7/2013 | Ribes Marti | |
| 8,695,177 B2 * | 4/2014 | Kato | F16B 21/065 |
| | | | 24/297 |
| 8,832,907 B2 | 9/2014 | De Jong et al. | |
| 9,062,696 B2 | 6/2015 | Demerath et al. | |
| 9,321,417 B1 | 4/2016 | Lepper | |
| 9,341,204 B2 | 5/2016 | Fischer | |
| 9,347,474 B2 * | 5/2016 | Mizukoshi | F16B 19/1081 |
| 2009/0205174 A1 | 8/2009 | Slobodecki et al. | |
| 2011/0197405 A1 | 8/2011 | Kato | |

FOREIGN PATENT DOCUMENTS

| | | |
|---|---|---|
| CN | 108291567 A | 7/2018 |
| DE | 19708838 A1 | 9/1998 |
| JP | 2001355621 A | 12/2001 |
| WO | 2017/131851 A1 | 8/2017 |

\* cited by examiner

FASTENER ASSEMBLY AND METHOD

CROSS-REFERENCES TO RELATED APPLICATIONS

The present application is based on and claims priority to U.S. Provisional Patent Application No. 62/703,919, filed on Jul. 27, 2019, which is incorporated herein by reference in its entirety.

STATEMENT REGARDING FEDERALLY SPONSORED RESEARCH

Not Applicable.

BACKGROUND

Generally, fastener assemblies may fasten two or more components to one another. In some configurations, a component may be inserted into a fastener to retain the component at least partially within the fastener.

BRIEF SUMMARY

The present disclosure relates generally to fastener assemblies and, more specifically, to a fastener assembly designed to remain in a fastened position under both high impact forces and static load forces.

In one aspect, the present disclosure provides a fastener assembly including a panel fastener and a lock pin. The panel fastener includes a panel retention tab, a first panel retention surface, and a second panel retention surface. The lock pin includes a flexible arm and a retention tab. The flexible arm includes an angled wall and an end surface and the retention tab includes a retention surface. The lock pin is insertable into the panel fastener to a first position and a second position. The flexible arm being configured to upon insertion of the lock pin into the panel fastener in a first direction to the first position, flex inwardly and then outwardly to bring the end surface into engagement with the panel retention tab. The lock pin being axially retained within the panel fastener at the first position via engagement between the end surface and the panel retention tab and engagement between the angled wall and the second panel retention surface. Upon insertion of the lock pin into the panel fastener in the first direction to the second position, the flexible arm being configured to flex inwardly to allow the retention tab to pass into the panel fastener to bring the retention surface into engagement with the first panel retention surface. Engagement between the retention surface and the first panel retention surface inhibits removal of the lock pin from the panel fastener in a second direction opposite to the first direction.

In one aspect, the present disclosure provides a fastener assembly including a panel fastener and a lock pin. The panel fastener includes a panel retention tab, a first panel retention surface, and a second panel retention surface. The lock pin includes a ramped wedge, a flexible arm, and a retention tab. The flexible arm includes an end surface and the retention tab includes a retention surface. The lock pin is insertable into the panel fastener to a first position and a second position. The flexible arm is configured to upon insertion of the lock pin into the panel fastener in a first direction to the first position, flex inwardly and then outwardly to bring the end surface into engagement with the panel retention tab. The lock pin being axially retained within the panel fastener at the first position via engagement between the end surface and the panel retention tab and engagement between the ramped wedge and the second panel retention surface. Upon insertion of the lock pin into the panel fastener in the first direction to the second position, the flexible arm is configured to flex inwardly to allow the retention tab to pass into the panel fastener to bring the retention surface into engagement with the first panel retention surface. Engagement between the retention surface and the first panel retention surface inhibits removal of the lock pin from the panel fastener in a second direction opposite to the first direction.

The foregoing and other aspects and advantages of the disclosure will appear from the following description. In the description, reference is made to the accompanying drawings, which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Conventional fastener assemblies implemented, for example, in side curtain airbag assemblies, as well as, in high impact areas of a motor vehicle suffer from issues with prohibitively high installation forces that result in ergonomic difficulties for a manufacturer. In some configurations, conventional fastener assemblies require additional components (e.g., a screw) to facilitate attachment to an application structure (e.g., a panel). This type of configuration necessitates the use of tooling or a manual twisting operation, which adds time, complexity, and cost to the assembly and installation of conventional fastener assemblies. In addition, conventional fastener assemblies are typically designed with complex bends in the inert component increasing the costs and manufacturing tolerances.

During operation, fastener assemblies used, for example, in side curtain airbag assemblies may be removed and reinstalled multiple times during the lifetime of the part. Conventional fastener assemblies may degrade over time due to the repetitive removal and reinstallation.

The present disclosure overcomes the foregoing deficiencies of convention fastener assemblies by providing a fastener assembly that includes a panel fastener and a lock pin, which may be inserted into the panel fastener to a first position and a second position. In some embodiments, the lock pin may be inserted into the panel fastener to the first position and the second position without the use of specialized tools and a manual twisting motion. For example, the lock pin may be inserted axially or linearly into the panel fastener. In some embodiments, the lock pin and the panel fastener may include retention features that enable the lock pin to snap into the first position and prevent relative motion between the lock pin and the panel fastener. In this way, for example, the lock pin may be retained in the first position and this state may be maintained, for example, during shipping of the fastener assembly.

The retention features may retain the lock pin in the first position until the fastener assembly is installed in its desired application (e.g., a side curtain airbag assembly on a vehicle). That is, once the fastener assembly is installed (e.g., via insertion into a panel) the lock pin may be unlocked from the first position and be allowed to be inserted into the panel fastener to the second position, which is the final assembled position of the fastener assembly. The lock pin and the panel fastener may include another set of retention features that prevent relative motion between the lock pin and the panel fastener, when the lock pin is in the second position. In general, the design and functionality of the fastener assembly enables the fastener assembly to be serviced multiple times with repeatable performance.

Figure 1:
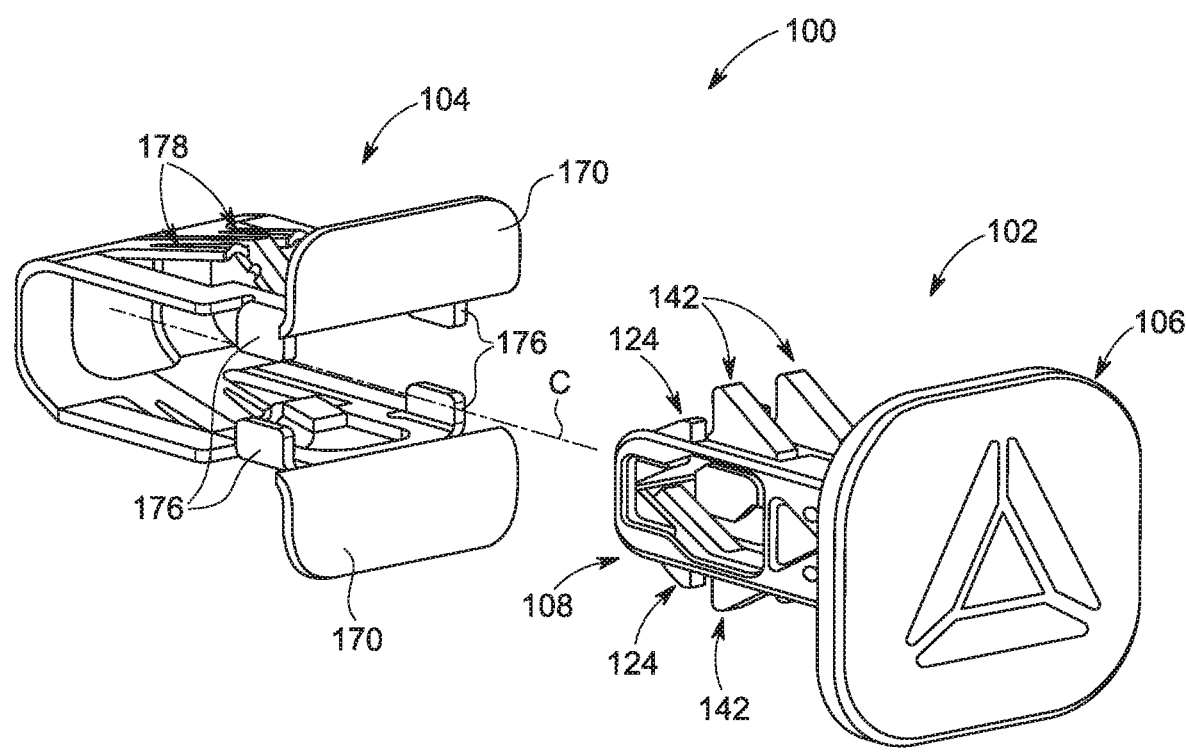
FIG. 1 is an exploded top, front, right isometric view of a fastener assembly according to the present disclosure.

FIG. 1 illustrates one embodiment of a fastener assembly 100 according to the present disclosure. In the illustrated embodiment, the fastener assembly 100 includes a lock pin 102 and a panel fastener 104. In general, the lock pin 102 may be selectively inserted at least partially into the panel fastener 104 and secured at a first position via interaction between retention features formed on the lock pin 102 and the panel fastener 104. During insertion of the lock pin 102 into the panel fastener 104, the lock pin 102 may be inserted along a center axis C that also extends through a center of the panel fastener 104. When the fastener assembly 100 is assembled, the lock pin 102 and the panel fastener 104 may share the center axis C, which extends longitudinally through a center of the fastener assembly 100.

In some embodiments, the lock pin 102 may be formed as a unitary component (i.e., manufactured from a single piece of material). In some embodiments, the lock pin 102 may be fabricated from a plastic material. In other embodiments, the lock pin 102 may be fabricated from one or more pieces or material and/or may be fabricated from a different type of material. In some embodiments, the panel fastener 104 may be formed as a unitary component. In some embodiments, the panel fastener 104 may be fabricated from a metal material. In other embodiments, the panel fastener 104 may be fabricated from one or more pieces or material and/or may be fabricated from a different type of material.

Figure 2:
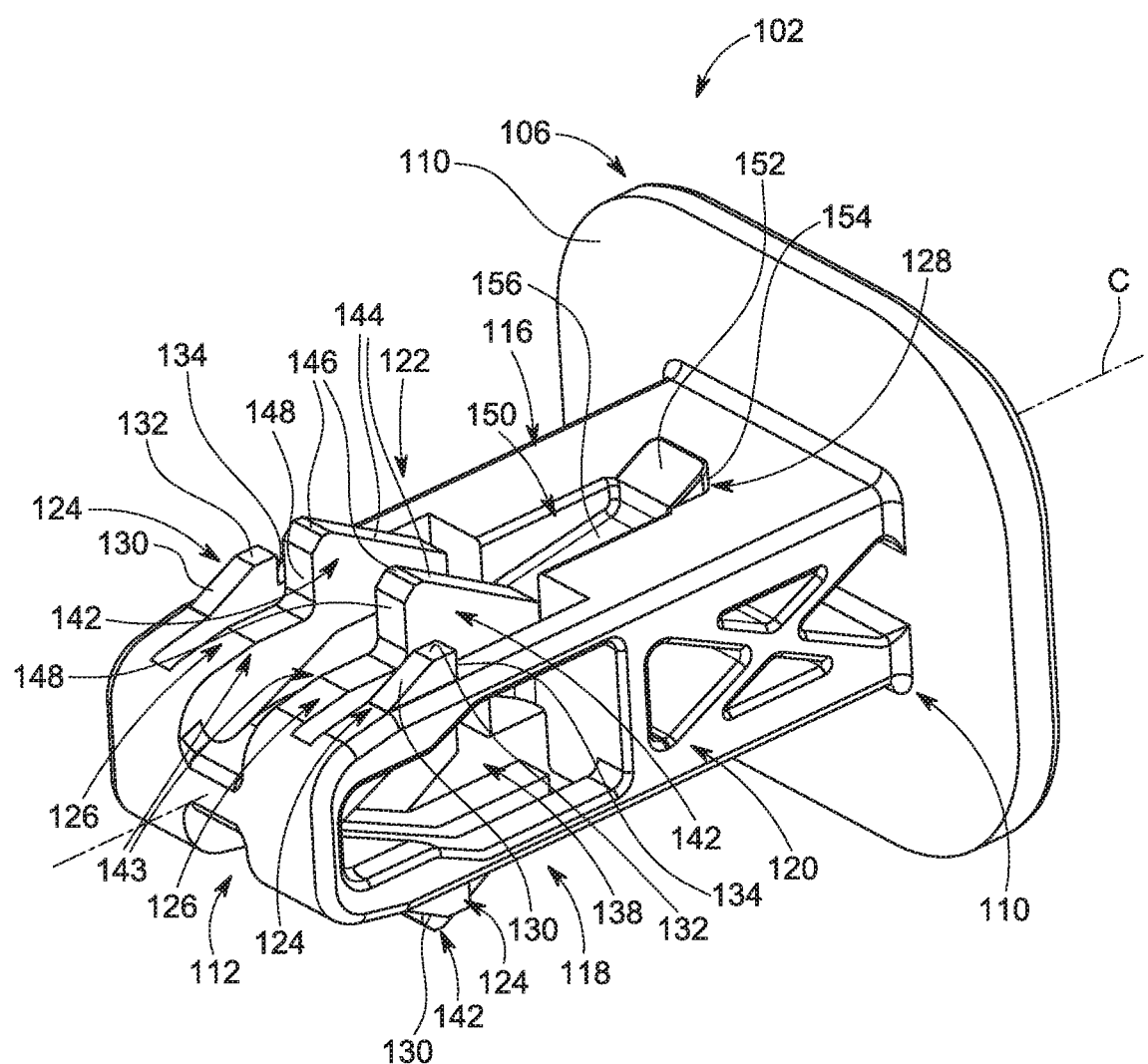
FIG. 2 is a back, top, right isometric view of a lock pin of the fastener assembly of FIG. 1.
Figure 3:
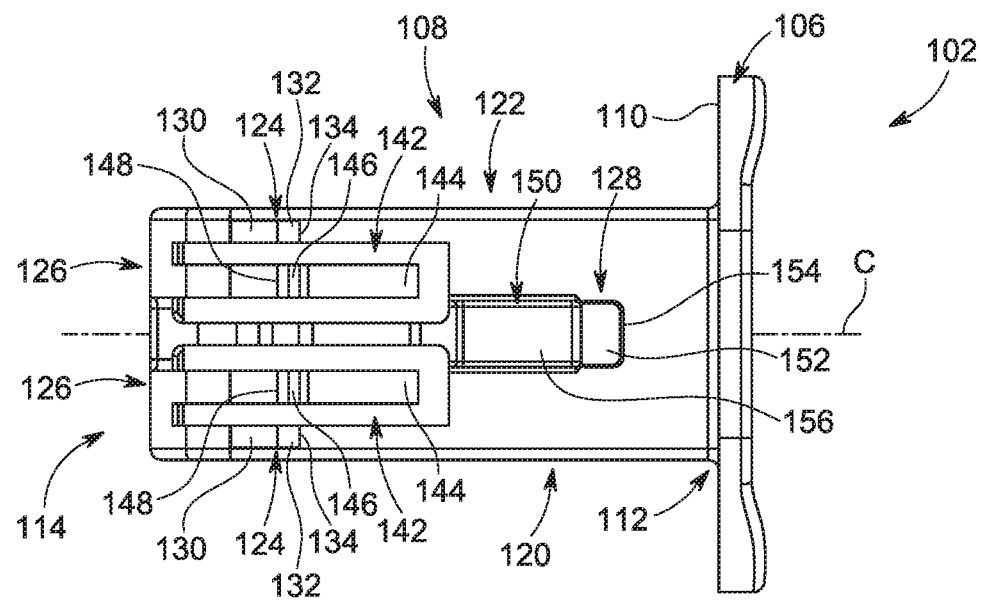
FIG. 3 is a top view of the lock pin of FIG. 2.
Figure 4:
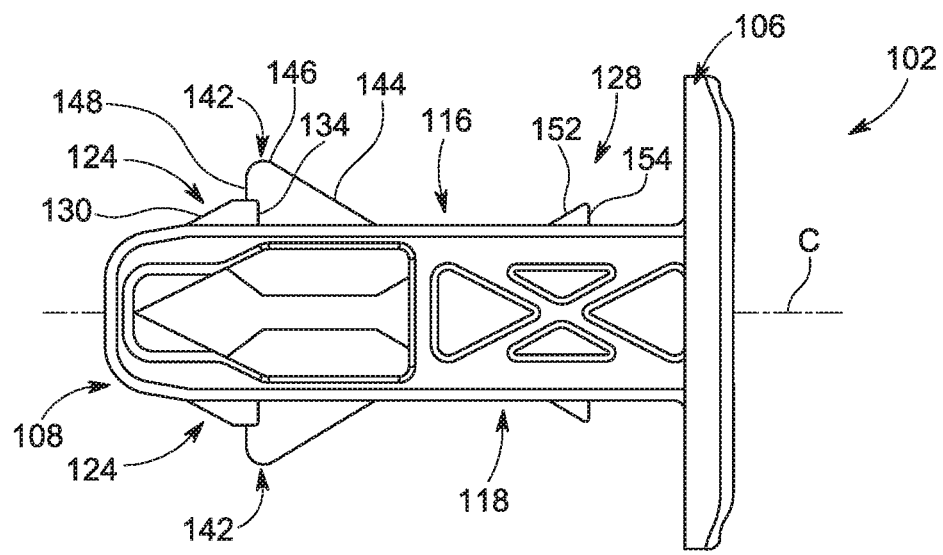
FIG. 4 is a right side view of the lock pin of FIG. 2.

With reference to FIGS. 2-4, the lock pin 102 may include a front panel 106 and a pin body 108 extending outwardly from a back surface 110 of the front panel 106 (e.g., in a direction along the center axis C from the perspective of FIG. 4). In the illustrated embodiment, the pin body 108 of the lock pin 102 and the features thereof may be symmetrical across horizontal and vertical planes that extend through a center of the lock pin 102. That is, the pin body 108 may be symmetrical about a plane that perpendicularly bisects the center axis C in a vertical direction (e.g., from the perspective of FIG. 2) and about a plane that perpendicularly bisects the center axis C in a horizontal direction (e.g., from the perspective of FIG. 2). As such, any description herein of a feature of the pin body 108 applies symmetrically to each corresponding symmetrical feature on the pin body 108.

The pin body 108 may define a first end 112, a second end 114, a first side 116 (e.g., a top side from the perspective of FIG. 2), a second side 118 (e.g., a bottom side from the perspective of FIG. 2), a third side 120 (e.g., a right side from the perspective of FIG. 2), and a fourth side 122 (e.g., a left side from the perspective of FIG. 2). The pin body 108 may extend longitudinally (e.g., in a direction along the center axis C) from the first end 112, where the pin body 108 attaches to the back surface 110, to the second end 114, which longitudinally opposes the first end 112. The first side 116 of the pin body 108 may oppose the second side 118 of the pin body 108, and the third side 120 of the pin body 108 may oppose the fourth side 122 of the pin body 108.

In general, the pin body 108 may include a plurality of retention features that are designed and arranged to retain the lock pin 102 at various positions within the panel fastener 104 during installation and assembly of the fastener assembly 100. In some embodiments, the lock pin 102 may include a plurality of ramped wedges 124, a plurality of flexible arms 126, and a plurality of retention tabs 128. In the illustrated embodiment, the plurality of ramped wedges 124 may include four ramped wedges 124, with a pair of ramped wedges 124 protruding outwardly from each of the first side 116 and the second side 118 of the pin body 108 (e.g., in a direction away from the center axis C from the perspective of FIG. 4). Each pair of the ramped wedges 124 arranged on the first side 116 and the second side 118 may be laterally separated from one another, with one of the ramped wedges 124 arranged adjacent to the third side 120 and the other of the ramped wedges 124 arranged adjacent to the fourth side 122. In some embodiments, the pin body 108 may include more or less than two ramped wedges 124 extending outwardly from the first side 116 and the second side 118.

Each of the ramped wedges 124 may include a ramped surface 130, a plateau 132, and an end surface or a pin retention surface 134. The ramped surface 130 may taper upwardly from the respective one of the first side 116 and the second side 118 (i.e., increase in height above the respective one of the first side 116 and the second side 118) as the ramped surface 130 extends in a direction from the second end 114 to the first end 112 of the pin body 108. The ramped surface 130 may continue to taper upwardly to a junction formed between the ramped surface 130 and the plateau 132. The plateau 132 may extend from the junction between the ramped surface 130 and the plateau 132, in a direction toward the first end 114, to a junction between the plateau 132 and the end surface 134. The plateau 132 may extend toward the first end 114 at a generally constant height above the respective one of the first side 116 and the second side 118. The end surface 134 of the ramped wedge 124 may turn perpendicularly inward to the respective one of the first side 116 and the second side 118 (e.g., in a direction toward the center axis C from the perspective of FIG. 4).

In the illustrated embodiment, the plurality of flexible arms 126 may include four flexible arms 126, with a pair of flexible arms 126 extending from the second end 114 of the pin body 108 adjacent to the first side 116 and a pair of flexible arms 126 extending from the second end 114 of the pin body 108 adjacent to the second side 118. Each pair of the flexible arms 126 may be arranged laterally inward from the corresponding pair of ramped wedges 124. That is, each of the flexible arms 126 may be arranged laterally inwardly from one of the plurality of ramped wedges 124 that is arranged laterally adjacent to the corresponding flexible arm 126. Each of the flexible arms 126 may extend longitudinally from the second end 114 of the pin body 108 in a direction toward the first end 112. Specifically, each of the plurality of flexible arms 126 may extend from the second end 114 to a location between the second end 114 and a transverse surface 136, which extends between the first side 116 and the second side 118 of the pin body 108.

In general, each of the flexible arms 126 may be configured to flex inwardly (e.g., in a direction toward the center axis C from the perspective of FIG. 4) into a cavity 138 defined within the pin body 108. For example, vertically aligned pairs of the flexible arms 126 may be configured to flex inwardly toward one another. In the illustrated embodiment, each of the flexible arms 126 may be rigidly attached to the pin body 108 only at the second end 114, and a gap may be formed between the remainder of the flexible arm 126 and the pin body 108. In this way, for example, each of the flexible arms 126 may be generally unattached to the pin body 108, other than the attachment at the second end 114. In this way, for example, the arm ends 140 may be configured to flex inwardly during assembly and installation as will be described herein.

Each of the flexible arms 126 may include a wedged protrusion 142 and a stem 143. Each of the wedged protrusions 142 may extend longitudinally along the corresponding flexible arm 126 from the arm end 140 to a junction between the arm end 140 and the stem 143. The stem 143 of the flexible arms 142 may extend longitudinally from the junction between the wedged protrusion 142 and the stem 143 to the second end 114 of the pin body 108.

Each of the wedged protrusions 142 may include a tapered surface 144, a peak 146, and an end surface 148. The tapered surface 144 may extend longitudinally from the arm end 140 to the peak 146. The tapered surface 144 may taper upwardly (e.g., in a direction away from the center axis C from the perspective of FIG. 4) as the tapered surface 144 extends in a direction from the arm end 140 toward the second end 114. That is, the wedged protrusion 142 may increase in vertical thickness or height (e.g., from the perspective of FIGS. 2 and 4) as the tapered surface 144 extends from the arm end 140 to the peak 146. In the illustrated embodiment, the peak 146 may define a generally rounded shape. As the wedged protrusion 142 continues to extend toward the second end 114 from the peak 146, the end surface 148 may extend perpendicularly inward toward the stem 143 of the flexible arm 126. In the illustrated embodiment, the end surface 148 may be arranged at a longitudinal location along the pin body 108 that overlaps with the ramped wedge 124 (see, e.g., FIG. 4).

With continued reference to FIGS. 2-4, the plurality of retention tabs 128 may include two retention tabs 128, with one retention tab 128 extending outwardly from the first side 116 of the pin body 108 and another retention tab 128 extending outwardly from a second side 118 of the pin body 108 (e.g., in a direction away from the center axis C from the perspective of FIG. 4). The retention tabs 128 may be arranged at a longitudinal location along the pin body 108 between the transverse surface 136 and the first end 112. Specifically, the pin body 108 may include a recessed portion 150 arranged on the first side 116 and the second side 118, and the retention tabs 128 may be located at a longitudinal end of the recessed portion 150 arranged adjacent to the first end 112.

In the illustrated embodiment, each of the retention tabs 128 may include an angled surface 152 and a retention surface 154. The angled surface 152 may taper upwardly from the respective one of the first side 116 and the second side 118 (e.g., in a direction away from the center axis C from the perspective of FIG. 4) as the angled surface 152 extends in a direction toward the first end 112 of the pin body 108. The angled surface 152 may continue to taper upwardly until a junction between the angled surface 152 and the retention surface 154. At the junction between the angled surface 152 and the retention surface 154, the retention surface 154 may extend perpendicularly inward to the respective one of the first side 116 and the second side 118 (e.g., in a direction toward the center axis C from the perspective of FIG. 4).

Each of the recessed portions 150 of the pin body 108 may extend inwardly into the respective one of the first side 116 and the second side 118 and may define a generally rectangular-shaped cutout in the respective one of the first side 116 and second side 118. Each of the recessed portions 150 may include a bottom surface 156 that tapers in further inwardly into the respective one of the first side 116 and the second side 118 (e.g., toward the center axis C) as the bottom surface 156 extends in a direction toward the second end 114. Each of the recessed portions 150 may extend longitudinally along the respective one of the first side 116 and the second side 118 from the transverse surface 136 to a junction between the recessed portion 150 and the corresponding one of the retention tabs 128.

Figure 5:
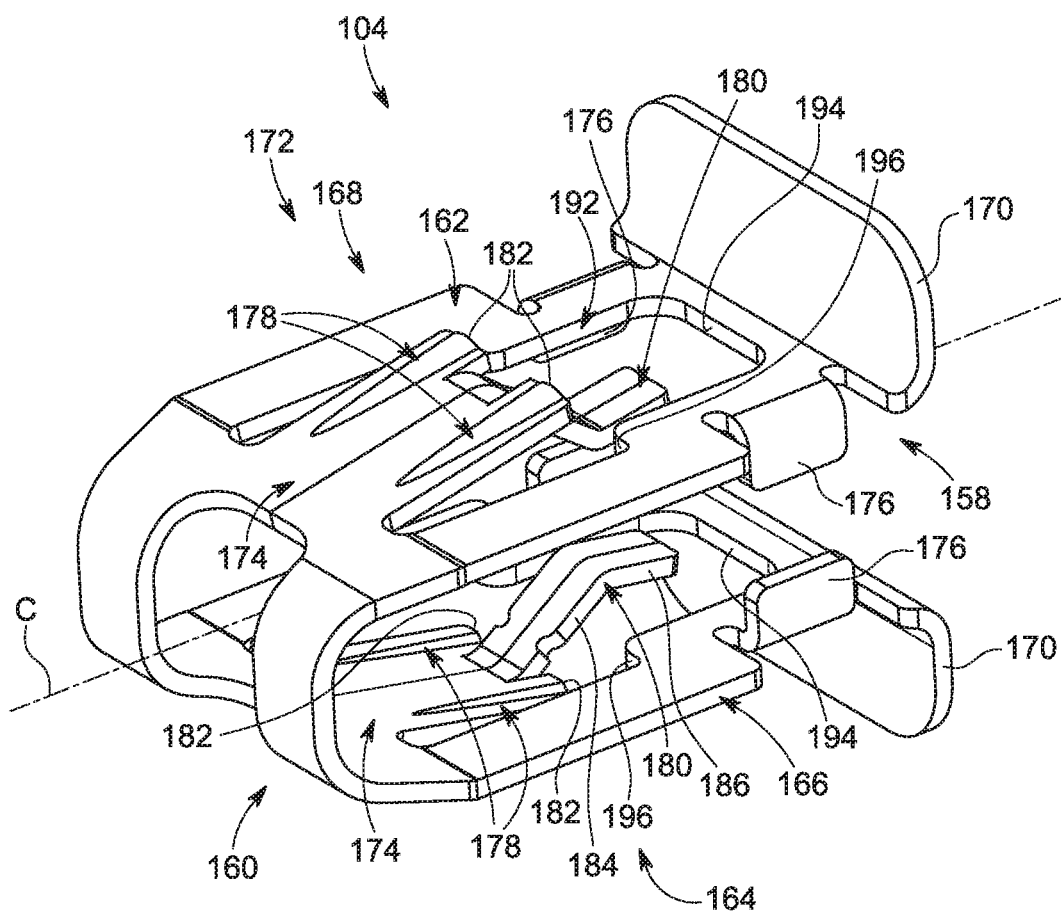
FIG. 5 is a back, top, right isometric view of a panel fastener of the fastener assembly of FIG. 1
Figure 6:
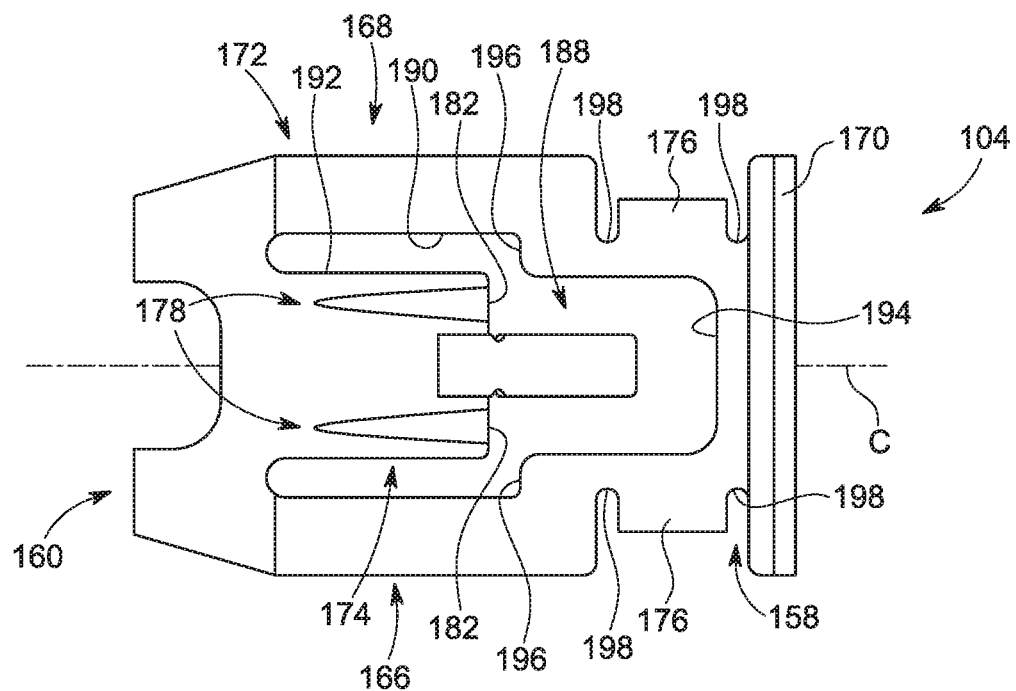
FIG. 6 is a top view of the panel fastener of FIG. 5.
Figure 7:
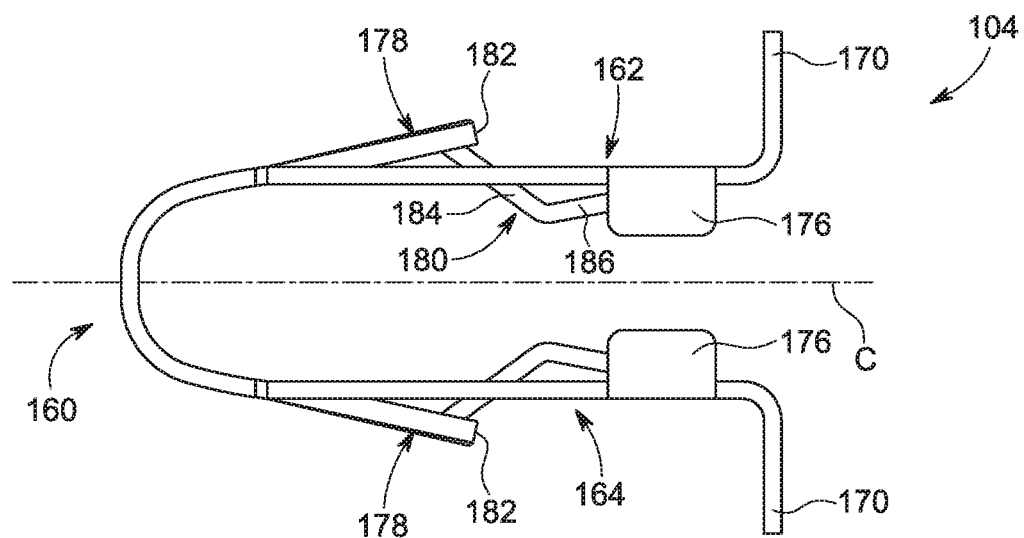
FIG. 7 is a right side view of the panel fastener of FIG. 5.
Figure 8:
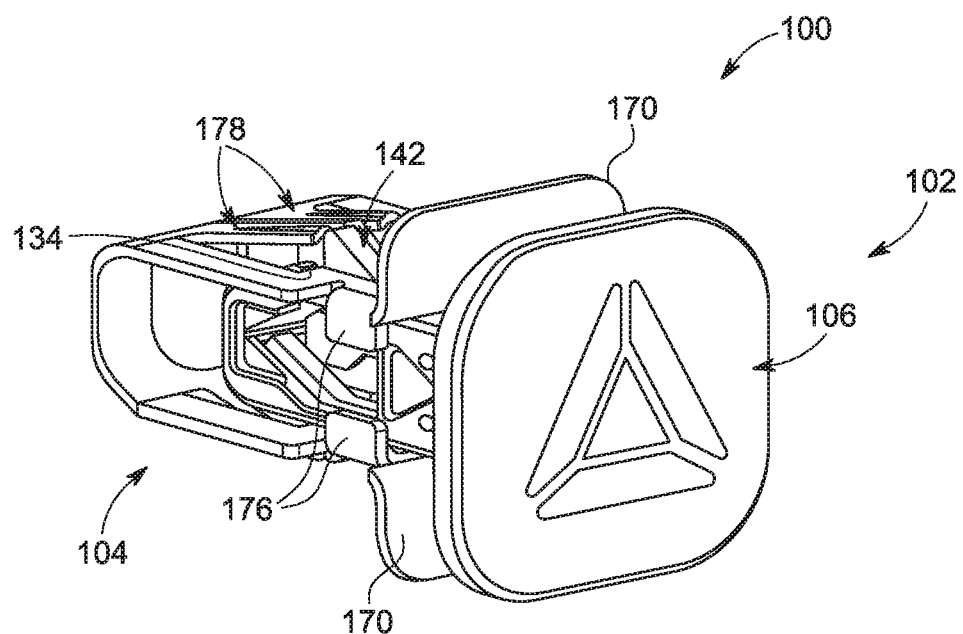
FIG. 8 is a top, front, right isometric view of the fastener assembly of FIG. 1 with the lock pin inserted into the panel fastener to a first position.

Turning to FIGS. 5-7, in the illustrated embodiment, the panel fastener 104 and the features thereof may be symmetrical across horizontal and vertical planes that extend through a center of the panel fastener 104. That is, the panel fastener 104 may be symmetrical about a plane that perpendicularly bisects the center axis C in a vertical direction (e.g., from the perspective of FIG. 5) and about a plane that perpendicularly bisects the center axis C in a horizontal direction (e.g., from the perspective of FIG. 5). As such, any description herein of a feature of the panel fastener 104 applies symmetrically to each corresponding symmetrical feature on the panel fastener 104.

In the illustrated embodiment, the panel fastener 104 may define a first end 158, a second end 160, a first side 162 (e.g., a top side from the perspective of FIG. 5), a second side 164 (e.g., a bottom side from the perspective of FIG. 5), a third side 166 (e.g., a right side from the perspective of FIG. 5), and a fourth side 168 (e.g., a left side from the perspective of FIG. 5). The panel fastener 104 may extend longitudinally (e.g., in a direction along the center axis C) from the first end 158 to the second end 160, which longitudinally opposes the first end 158. The first side 162 of the panel fastener 104 may oppose the second side 164 of the panel fastener 104, and the third side 166 of the panel fastener 104 may oppose the fourth side 168 of the panel fastener 104.

The panel fastener 104 may include one or more front flanges 170 and a body portion 172 that extends generally perpendicularly away from one or more front flanges 170 (e.g., in a direction along the center axis C). In the illustrated non-limiting example, the panel fastener 104 may include two front flanges 170 arranged at the first end 158 of the panel fastener 104, with one of the front flanges 170 extending from the first side 162 in a direction away from the center axis C (e.g., from the perspective of FIG. 7) and another of the front flanges 170 extending from the second side 164 in a direction away from the center axis C (e.g., from the perspective of FIG. 7). In other words, the front flanges 170 may extend away from one another. In the illustrated embodiment, the panel fastener 104 may define a generally rounded junction between each of the front flanges 170 and the body portion 172.

In general, the panel fastener 104 may include a plurality of panel retention features that are designed and arranged to interact with retention features of the lock pin 102 to retain the lock pin 102 at various positions within the panel fastener 104 during installation and assembly of the fastener assembly 100. For example, the body portion 172 may include one or more tabbed portions 174 and a plurality of brackets 176. In the illustrated embodiment, the body portion 172 may include two tabbed portions 174, with one tabbed portion 174 extending from the second end 160 of the panel fastener 104 adjacent to the first side 162 and another tabbed portion 174 extending from the second end 160 of the panel fastener 104 adjacent to the second side 164. Each of the tabbed portions 174 may include a pair of panel retention tabs 178 and an angled arm 180. The tabbed portions 174 may be laterally separated from one another and the angled arm 180 may extend longitudinally toward the first end 158 from between the tabbed portions 174.

In the illustrated embodiment, the pair of panel retention tabs 178 arranged on the first side 162 and the second side 164 may be angled away from the respective one of the first side 162 and the second side 164 (e.g., away from the center axis C from the perspective of FIG. 7). For example, the panel retention tabs 178 may extend longitudinally from the second end 160 in a direction toward the first end 158. As the panel retention tabs 178 extend from the second end 160 toward the first end 158, the panel retention tabs 178 may angle away from the respective one of the first side 162 and the second side 164. The panel retention tabs 178 may extend toward the first end 158 to a panel tab end 182.

Each of the angled arms 180 may extend longitudinally toward the first end 158 from between the respective pair of the panel retention tabs 178. Each of the angled arms 180 may include a first angled portion 184 and a second angled portion 186. The first angled portion 184 may be arranged longitudinally between the second end 160 and the second angled portion 186. In the illustrated non-limiting example, the first angled portion 184 may angle in a direction toward the center axis C and the second angled portion 186 may angle in a direction away from the center axis C.

In the illustrated embodiment, the tabbed portions 174 may be attached to the body portion 172 only at the second end 160, and a gap may be formed between the remainder of the tabbed portions 174 and the body portion 172. In other words, the first side 162 and the second side 164 of the body portion 172 may include a cutout 188 defined between an inner edge 190 of the body portion 172 and an outer edge 192 of the tabbed portions 174. A first panel retention surface 194 and a pair of second panel retention surfaces 196 may be defined by the inner edge 190 of the body portion 172 on the first side 162 and the second side 164. The first panel retention surface 194 may be arranged adjacent to the first end 158 of the panel fastener 104, and the second panel retention surfaces 196 may be arranged longitudinally closer to the second end 160 and laterally outward from the first panel retention surface 194.

With continued reference to FIGS. 5-7, in the illustrated embodiment, the plurality of brackets 176 may include four brackets 176, with a pair of brackets 176 arranged on the third side 166 and a pair of brackets 176 arranged on the fourth side 168. Each pair of brackets 176 may extend generally toward one another (e.g., in a direction toward the center axis C). For example, one of the pair of brackets 176 may extend from the first side 162 in a direction toward the second side 164 and another of the pair of brackets 176 may extend from the second side 164 in a direction toward the first side 162. In the illustrated embodiment, each of the brackets 176 may be arranged adjacent to the first end 158 of the panel fastener 104 and may extend longitudinally between a pair of lateral notches 198 formed in a respecting one of the first side 162 and the second side 164.

In general, the brackets 176 may be design to receive the lock pin 102 therein and generally prevent lateral displacement of the lock pin 102 when at least partially received within the panel fastener 104. For example, a lateral width defined between the brackets 176 (e.g., a distance defined between the brackets 176 in a direction perpendicular to the center axis C from the perspective of FIG. 6) may be greater than or equal to a lateral width defined by the pin body 108 to enable the pin body 108 to be inserted into the panel fastener 104.

A non-limiting example of assembly and operation of the fastener assembly 100 will be described with reference to FIGS. 8-19. Looking first to FIG. 8, the fastener assembly 100 may be assembled into a pre-assembled state, for example, for shipping of the fastener assembly 100, where the lock pin 102 is inserted into the panel fastener 104 to a first position. In general, interactions between retention features formed on the lock pin 102 and the panel fastener 104 may hold the lock pin 102 in the first position, which, for example, maintains an orientation and position of the lock pin 102 within the panel fastener 104 until the fastener assembly 100 is installed in an final application (e.g., a panel on a vehicle). In this way, for example, the fastener assembly 100 may maintain a position and orientation of the lock pin 102 during shipping of the fastener assembly 100 to an end user.

Figure 9:
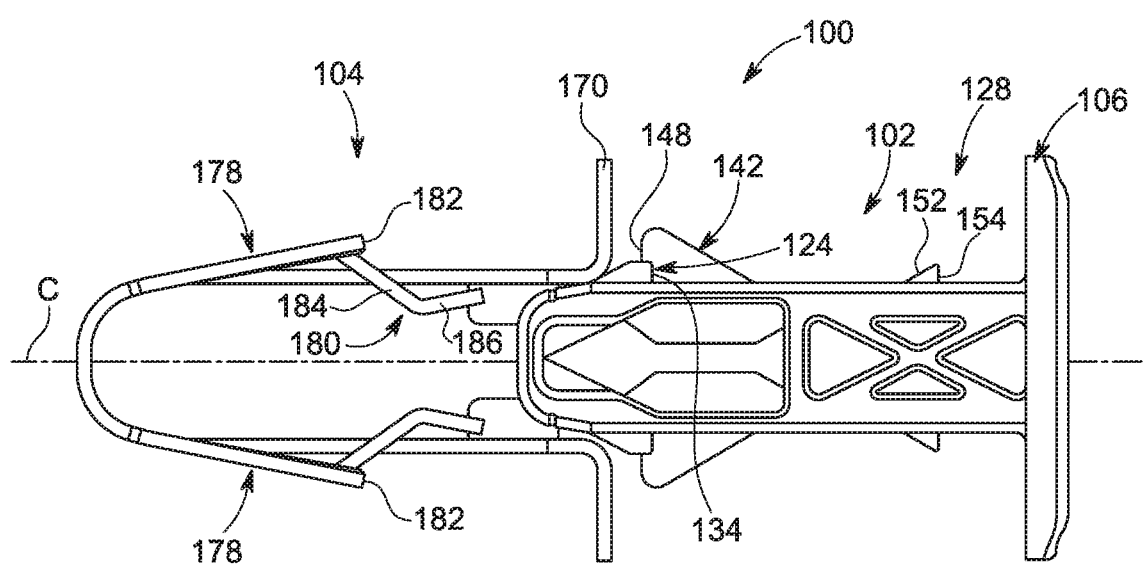
FIG. 9 is a right side view of the fastener assembly of FIG. 8 with the lock pin inserted into the panel fastener to an initial position.

Turning to FIGS. 9-12, to assemble the fastener assembly 100 into the shipping configuration, the lock pin 102 may be axially inserted (e.g., along the center axis C) into the panel fastener 104. Initially, as illustrated in FIG. 9, the second end 114 of the lock pin 102 may be inserted into the first end 158 of the panel fastener 104 between the front flanges 170. As the second end 114 of the lock pin 102 is inserted further into the panel fastener 104, the ramped wedged 124 may engage panel fastener 104 and bias the front flanges 170 outwardly away (e.g., in a direction away from the center axis C from the perspective of FIG. 10) from one another, for example, via the ramped surfaces 130 of the ramped wedges 124 (see, e.g., FIG. 10). The separation of the front flanges 170 provided by the ramped wedges 124 may enable the wedged protrusions 142 of the flexible arms 126 to be received within the front flanges 170. That is, without the ramped wedges 124 biasing the front flanges 170 away from one another, the end surfaces 148 of the wedged protrusions 142 may act as a stop and prevent further axial insertion of the lock pin 102 into the panel fastener 104.

Figure 10:
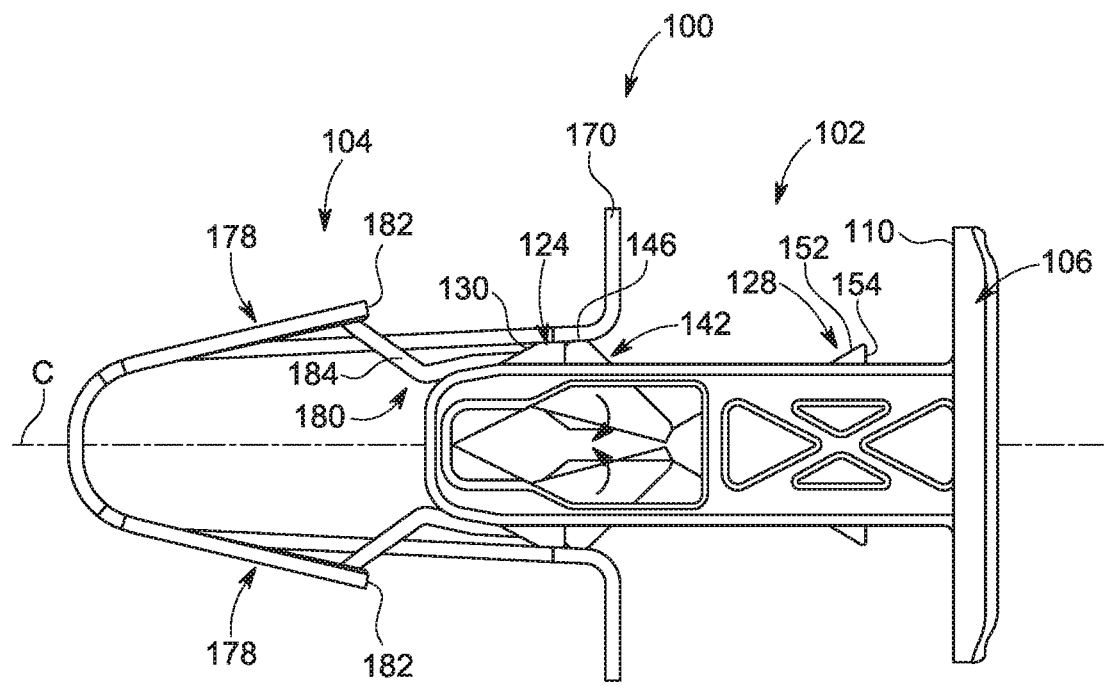
FIG. 10 is a right side view of the fastener assembly of FIG. 8 with the lock pin inserted into the panel fastener to a mid position.
Figure 11:
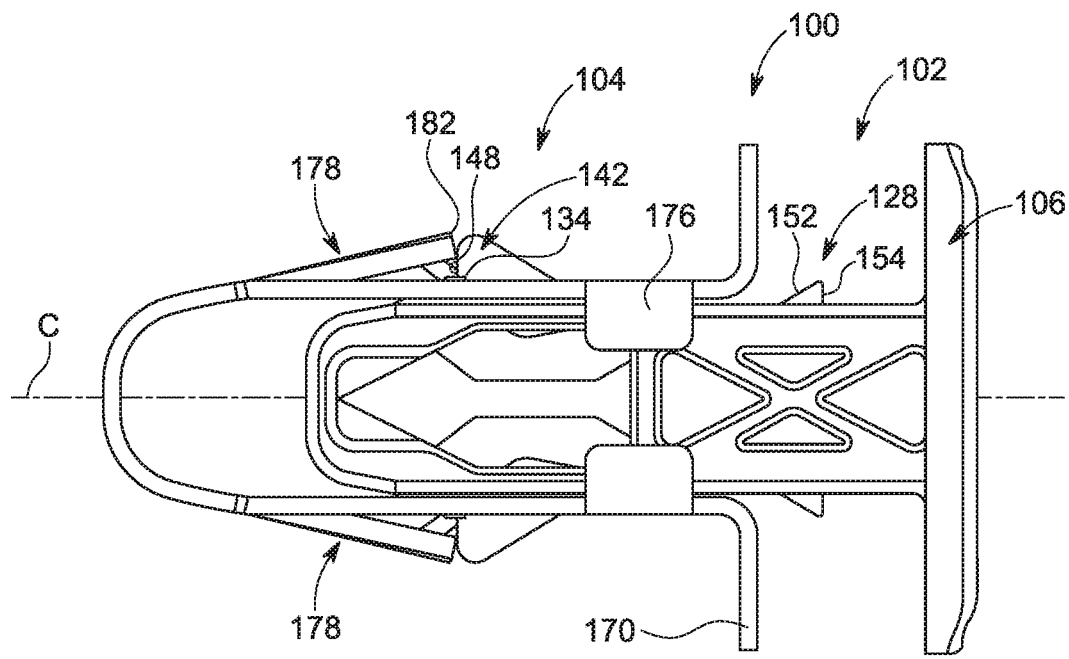
FIG. 11 is a right side view of the fastener assembly of FIG. 8 with the lock pin inserted into the panel fastener to a first position.

As illustrated in FIG. 10, as the wedged protrusions 142 are received within the panel fastener 104, the panel fastener 104 may bias the wedged protrusions 142, such that the wedges protrusions 142 flex inwardly (e.g., in a direction toward the center axis C from the perspective of FIG. 10). The wedged protrusions 142 may remain flexed inwardly as the lock pin 102 continues to be inserted axially into the panel fastener 104, until the wedges protrusions 142 reach the cutout 188 formed in the first side 162 and the second side 164 of the panel fastener 104. Once the wedged protrusions 142 move past the first panel retention surfaces 194 and reach the cutout 188, the wedged protrusions 142 may flex outwardly (e.g., in a direction away from the center axis C from the perspective of FIG. 11) and protrude at partially through the cutout 188, as illustrated in FIG. 11. The ramped wedges 124 may also extend at least partially through the cutout 188, once the lock pin 102 is inserted into the panel fastener 104 to a position where the ramped wedges 124 move past the second panel retention surfaces 196.

Figure 12:
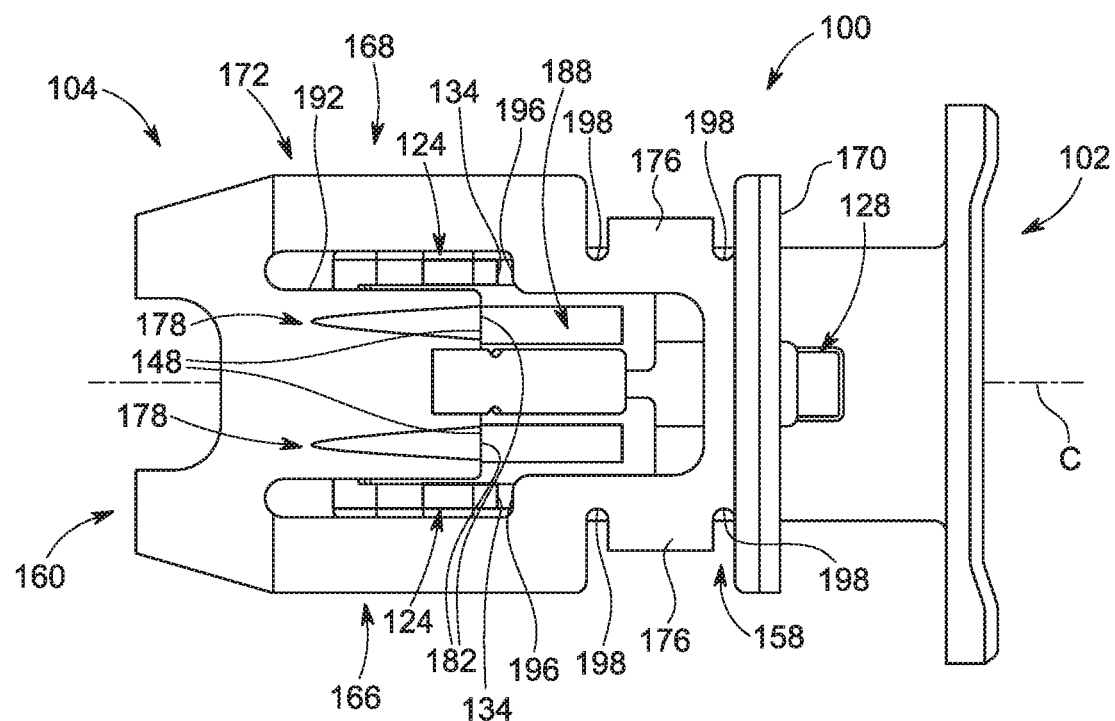
FIG. 12 is a top view of the fastener assembly of FIG. 11.

With reference to FIGS. 11 and 12, once the wedged protrusions 142 flex outwardly and extend through the cutout 188, the lock pin 102 may continue to be inserted axially into the panel fastener 104 to a first position where the end surfaces 148 engage the panel tab ends 182 of the panel retention tabs 178. In general, when the lock pin 102 is in the first position, the lock pin 102 may be axially and laterally retained within the panel fastener 104. For example, the panel tab ends 182 of the panel retention tabs 178 may inhibit the lock pin 102 from being inserted further into the panel fastener 104 in a first direction (e.g., axially to the left from the perspective of FIGS. 11 and 12) via engagement with the end surfaces 148 of the wedged protrusions 142. The second panel retention surfaces 196 may inhibit the lock pin 102 from being removed from the panel fastener 104 in a second direction (e.g., axially to the right from the perspective of FIGS. 11 and 12) via engagement with the end surfaces 134 of the ramped wedges 124. As such, the lock pin 102 may be retained axially within the panel fastener 104 when the lock pin 102 is inserted to the first position.

In addition to the axial retention, the lock pin 102 may be retained laterally within the panel fastener 104, for example, via the plurality of brackets 176. That is, the plurality of brackets 176 may inhibit the lock pin 102 from displacing laterally, or rotationally relative to the panel fastener 104. Thus, once the lock pin 102 is inserted into the panel fastener 104 to the first position, the lock pin 102 may be retained axially and laterally, or rotationally, relative to the panel fastener 104. In this way, for example, the general orientation and assembly of the fastener assembly 100 may be maintained to enable the fastener assembly 100 to be shipped to an end user in a consistently assembled state and orientation. This may reduce the an assembly time for an end user, as well as improve the consistency in the end assembly since the fastener assembly 100 may be provided in a pre-assembled state with the lock pin 102 inserted into the fastener 104 to the first position.

Once the pre-assembled fastener assembly 100 is shipped to an end user, the fastener assembly 100 may be installed in a given application. For example, the fastener assembly 100 may be installed in high impact force areas on a vehicle, or another structure that requires a fastener to resist fracturing and be retained in a fastened position under both high impact forces and static load forces. In one non-limiting application, the fastener assembly 100 may be installed through a panel 200, for example, on a side curtain airbag assembly on a vehicle. The panel 200 may include a cutout 202 defined by an inner surface 204, which extends through the panel 200 from a first surface 206 to a second surface 208.

Figure 13:
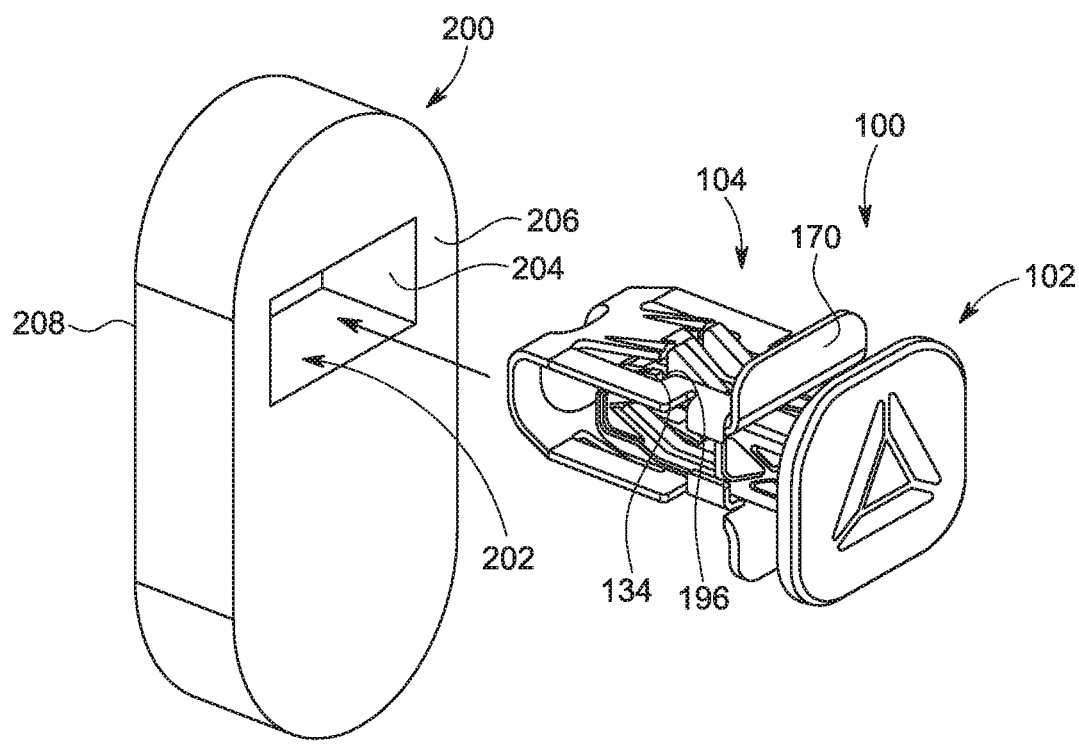
FIG. 13 is a partially exploded top, front, right isometric view of the fastener assembly of FIG. 8 being inserted into a panel.
Figure 14:
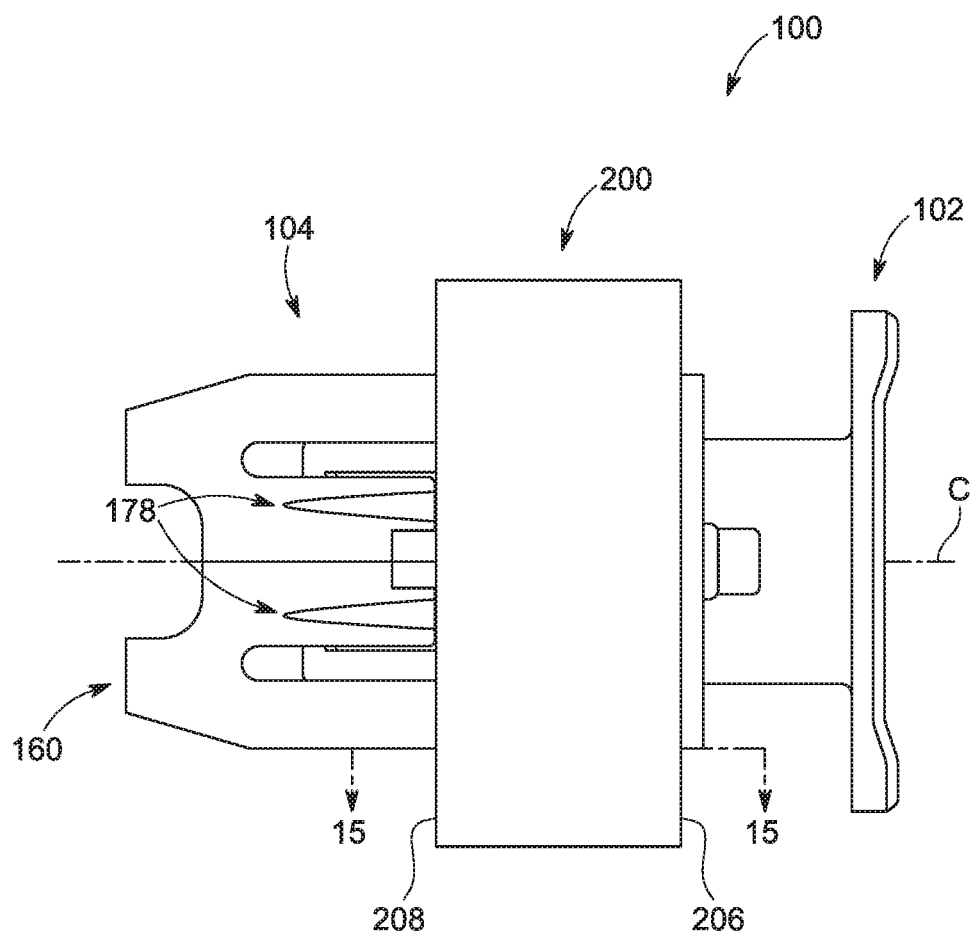
FIG. 14 is a top view of the fastener assembly and the panel with the faster assembly inserted into the panel.

To assembly the fastener assembly 100 to the panel 200, the fastener assembly 100 may be inserted axially into the cutout 202 of the panel 200, as illustrated in FIG. 13. Specifically, the cutout 202 may be designed to receive the body portion 172 of the panel fastener 104 therein. As the body portion 172 of the panel fastener 104 is inserted into the cutout 202, the inner surface 204 may slide over the panel retention tabs 178 and the wedged protrusions 142 of the flexible arms 126. The body portion 172 may continue to be inserted through cutout 202 in the panel 200 past the panel retention tabs 178 to an installed position (see, e.g., FIGS. 14-16) where the panel 200 is arranged between the panel tab ends 182 of the panel retention tabs 178 and the front flanges 170 of the panel fastener 104. When the panel 200 is in the installed position, the panel fastener 104 may axially retain the panel 200 (e.g., substantially inhibit the panel fastener 104 from being removed from cutout 202 without input from an end user or another tool/machine) via the arrangement between the panel tab ends 182 of the panel retention tabs 178 and the front flanges 170.

Figure 15:
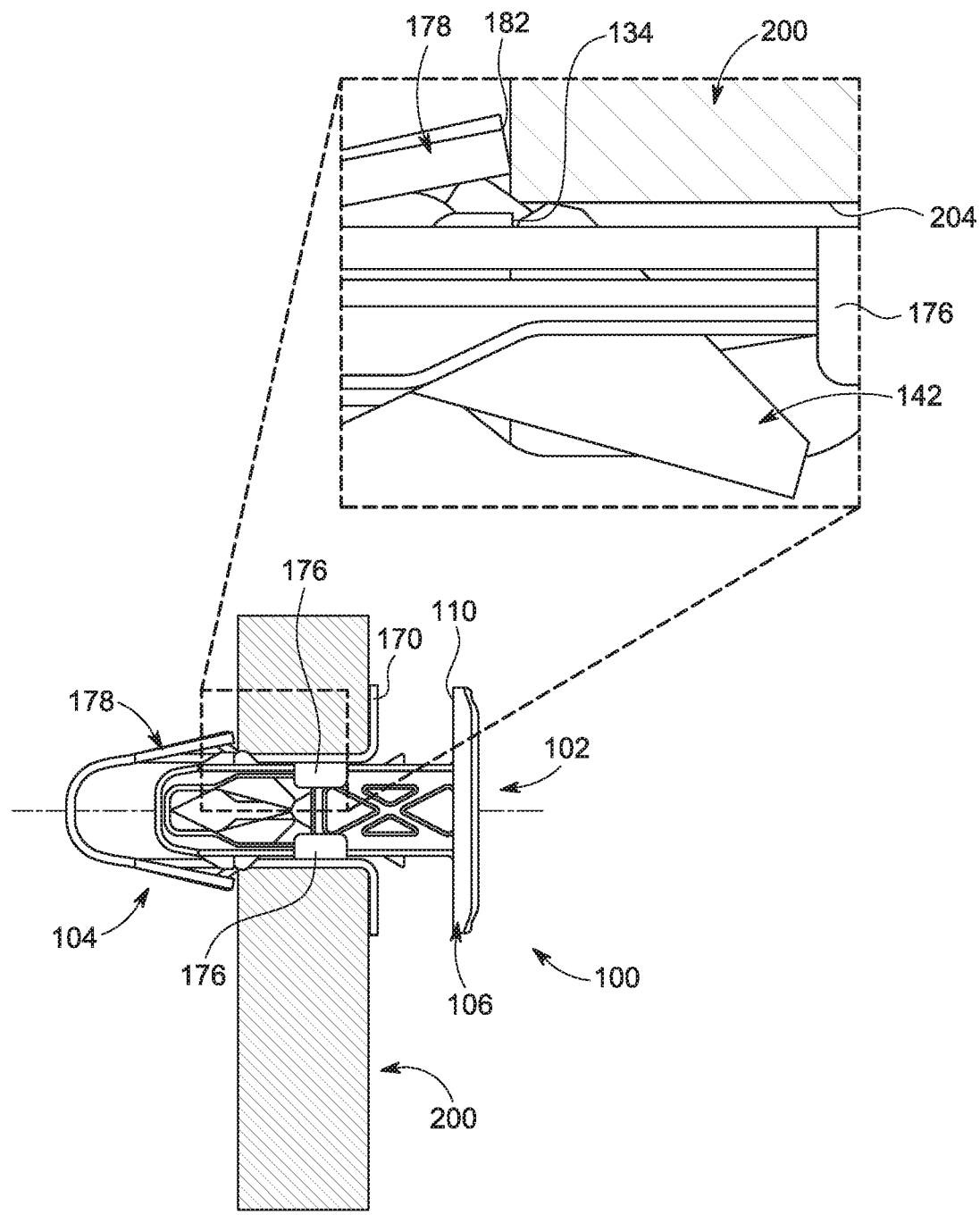
FIG. 15 is a right side view of the fastener assembly and the panel of FIG. 14 including an enlarged view of a section of the fastener assembly and the panel.
Figure 16:
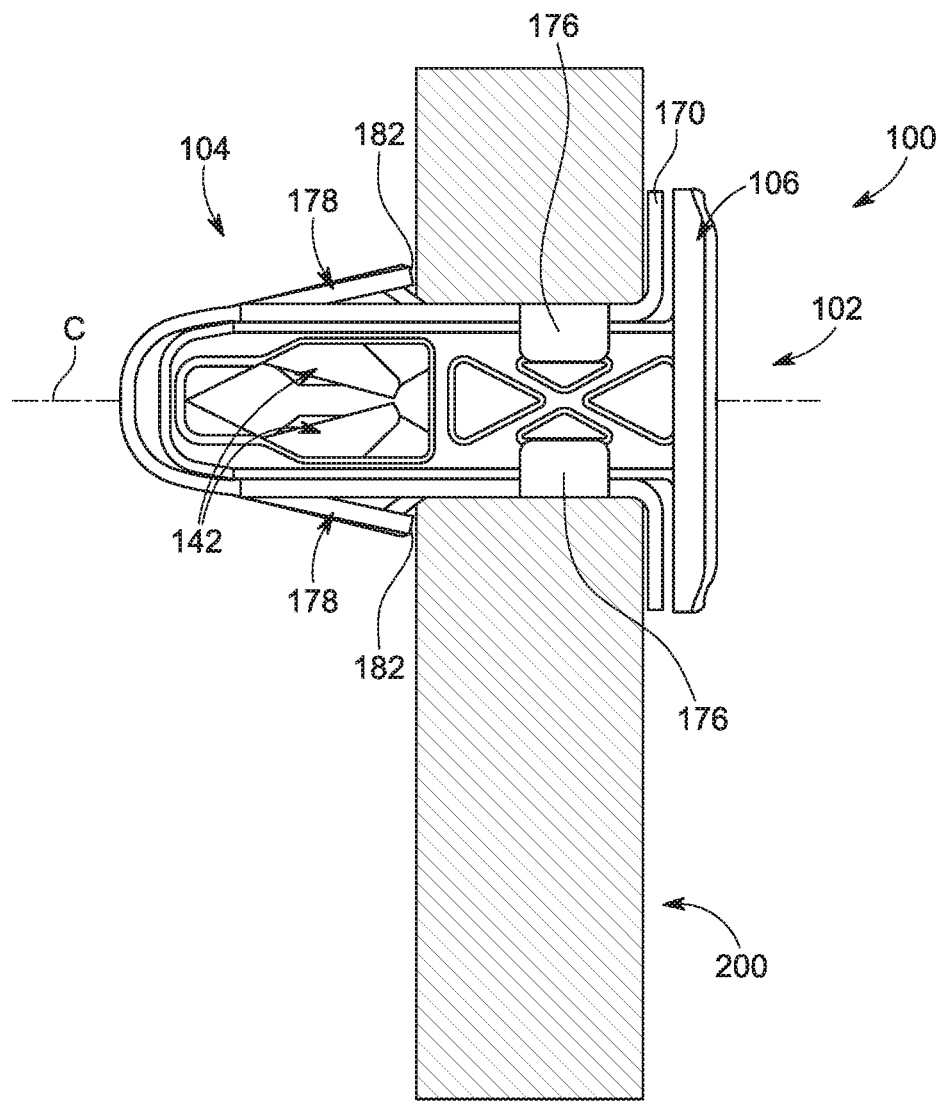
FIG. 16 is a right side view of the fastener assembly and the panel of FIG. 14 with the lock pin inserted into the panel fastener to a second position.

With the fastener assembly 100 installed into the panel 200, the inner surface 204 of the panel 200 may engage the wedged protrusions 142 of the lock pin 102 and the bias wedged protrusions 142 such that the wedged protrusions 142 flex inwardly (e.g., toward the center axis C from the perspective of FIG. 15). Specifically, as illustrated in FIG. 15, the inner surface 204 may engage the peaks 146 of the wedged protrusions 142 and bias the wedged protrusions 142 inwardly. In general, once the fastener assembly 100 is installed into the panel 200, the lock pin 102 may be unlocked axially in the first direction and may be allowed to be inserted further into the panel fastener 102 to a second position. For example, the end surfaces 148 of the wedged protrusions 142 may be biased clear of potential engagement with the panel tab ends 182 of the panel retention tabs 178, which may enable the lock pin 102 to be inserted axially further into the panel fastener 104 in the first direction (e.g., axially to the left from the perspective of FIGS. 15 and 16). The lock pin 102 may then be inserted into the panel fastener 104 to a second position, as illustrated in FIG. 16, which may represent a final assembled state of the fastener assembly 100.

Figure 17:
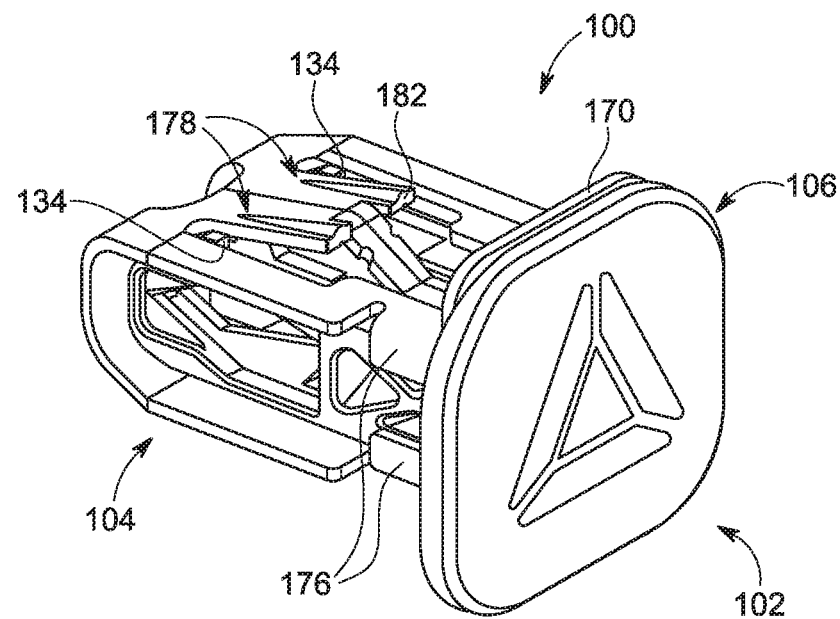
FIG. 17 is a top, front, right isometric view of the fastener assembly of FIG. 8 with the lock pin inserted into the panel fastener to a second position.
Figure 18:
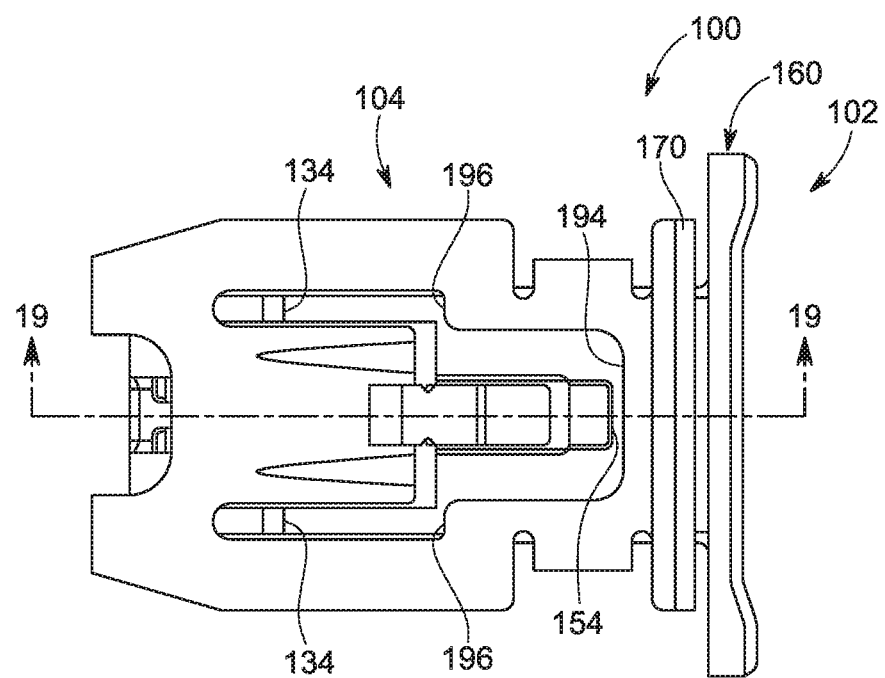
FIG. 18 is a top view of the fastener assembly of FIG. 17.
Figure 19:
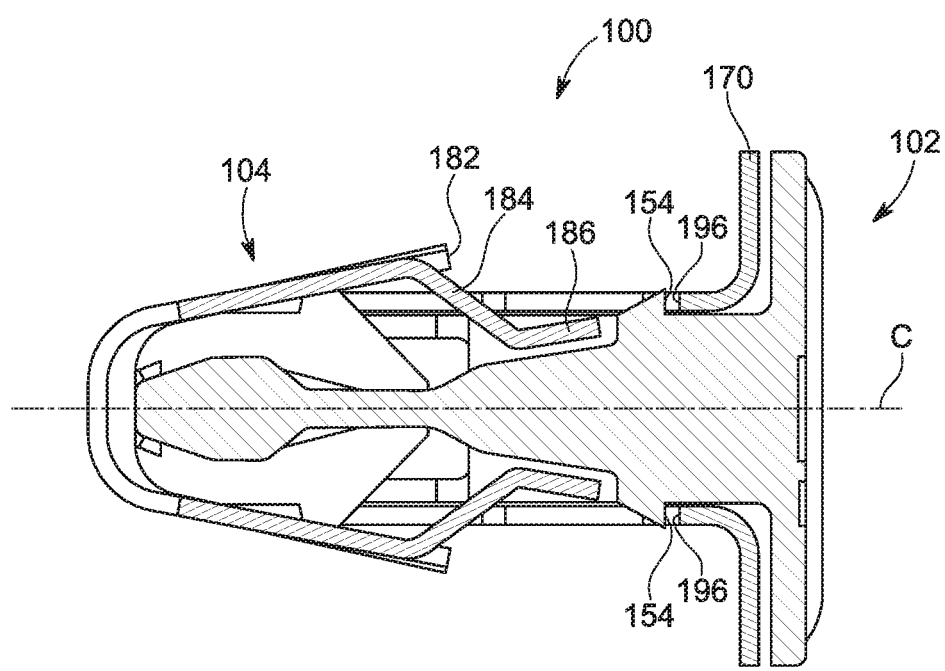
FIG. 19 is a cross-sectional view of the fastener assembly of FIG. 18 taken along line 19-19.

As illustrated in FIGS. 17-19, when the lock pin 102 is inserted into the panel fastener 104 to the second position, engagement between the front flanges 170 and the back surface 110 of the front panel 106 may inhibit further axial insertion of the lock pin 102 in the first direction. In addition, the retention tabs 128 may at least partially align with the first panel retention surfaces 194. For example, as illustrated in FIG. 19 in particular, the retention surfaces 154 of the retention tabs 128 may align with the first panel retention surfaces 194, such that the retention surfaces 154 may engage the first panel retention surfaces 194 if the lock pin 102 is displaced a sufficient distance axially in the second direction (e.g., to the right from the perspective of FIG. 19).

In general, when the lock pin 102 is in the second position, the lock pin 102 may be axially and laterally retained within the panel fastener 104. For example, the front flanges 170 may inhibit the lock pin 102 from being inserted further into the panel fastener 104 in the first direction (e.g., axially to the left from the perspective of FIG. 19) via engagement with the back surface 110 of the front panel 106. The first panel retention surfaces 194 may inhibit the lock pin 102 from being removed from the panel fastener 104 in the second direction (e.g., axially to the right from the perspective of FIG. 19) via engagement with the retention surfaces 154 of the retention tabs 128. As such, the lock pin 102 may be retained axially within the panel fastener 104 when the lock pin 102 is inserted to the second position.

Similar to when the lock pin 102 is in the first position within the panel fastener 104, the lock pin 102 may be retained laterally within the panel fastener 104, for example, via the plurality of brackets 176. Alternatively or additionally, the panel 200 may provide lateral stability to the lock pin 102, and/or the fastener assembly 100 in general. With the lock pin 102 being axially and laterally retained in the second position, the fastener assembly 100 may maintain its final assembled state during both static and dynamic loads applied thereto.

As described herein, the fastener assembly 100 may be assembled into a pre-assembled state where the lock pin 102 is at least partially inserted into the panel fastener 104 to a first position. In this pre-assembled state, the lock pin 102 may be axially and laterally retained within the panel fastener 104 to enable the fastener assembly 100 to be shipped to an end user. The fastener assembly 100 may then be installed into an end application (e.g., into panel 200). Upon installation into the end application (e.g., insertion of the fastener assembly 100 into the cutout 202 of the panel 200), the lock pin 102 may be unlocked axially in a direction that enables the lock pin 102 to be inserted to a second position to transition the fastener assembly 100 to a final assembled state.

In addition to the selective locking and unlocking of the lock pin 102 provided by the design of the fastener assembly 100, the fastener assembly 100 may be assembled via axial insertion of the lock pin 102 into the panel fastener 104, and via axial insertion of the panel fastener 104 and lock pin 102 into an end application (e.g., the panel 200). As such, the fastener assembly 100 may be assembled and installed on an end application without the need for tools and/or rotational motion, which provides a more ergonomically efficient assembly and installation process. Further, the fastener assembly 100 may be removed from the end application (e.g., the panel 200) and disassembled/serviced one or more times without a degradation in the performance and functionality of the fastener assembly 100. That is, the ability of the fastener assembly 100 to retain its position under static and dynamic loads may not be affected by the removal, disassembly, and/or service of the fastener assembly 100.

Figure 20:
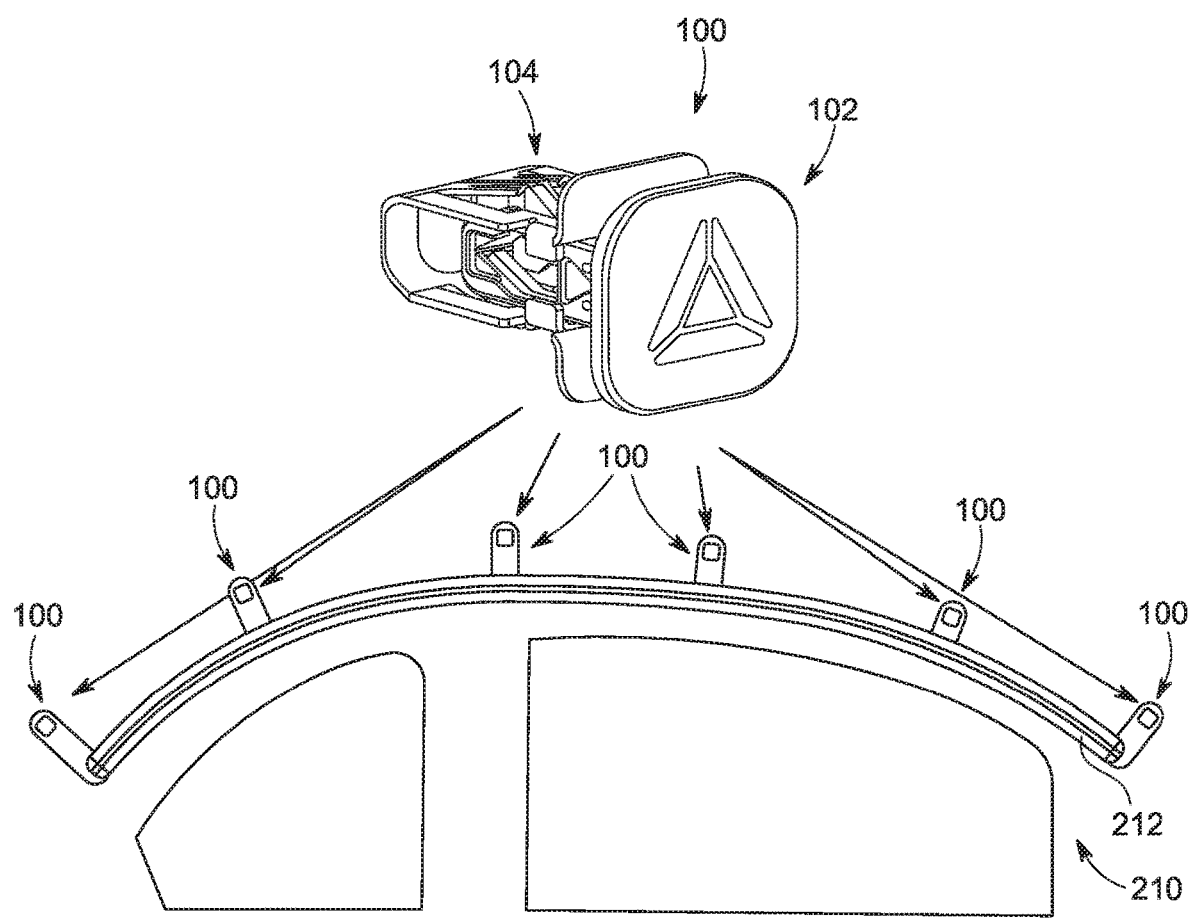
FIG. 20 is a schematic illustration of a plurality of the fastener assemblies of FIG. 16 installed in a side curtain airbag.

As described herein and illustrated in FIG. 20, in one non-limiting application the fastener assembly 100 may be installed in a side curtain airbag assembly 210 on a vehicle. In the illustrated embodiment, the side curtain airbag assembly 210 may include a plurality of the fastener assemblies 100 installed through a panel 212 of the vehicle and may be arranged at various location along the panel 212. In other non-limiting applications, the fastener assembly 100 may be installed and implemented on other high impact applications on a vehicle or anther on another device/structure.

Figure 21:
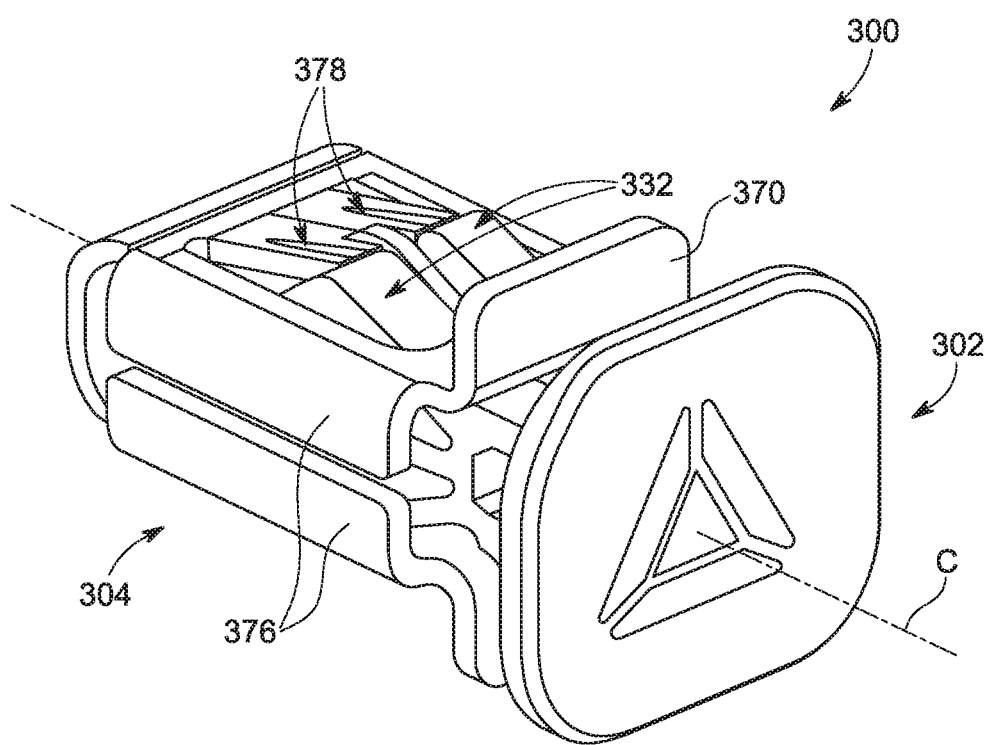
FIG. 21 is a top, front, right isometric view of a fastener assembly according to another aspect of the present disclosure with a lock pin inserted into a panel fastener to a first position.

It should be appreciated that the design and structure of the fastener assembly 100 may be altered, while the functionality and advantages described herein are maintained. For example, FIG. 21 illustrates another embodiment of a fastener assembly 300 according to the present disclosure. In general, the functionality and advantages of the fastener assembly 100 may also apply to the fastener assembly 100. For example, the fastener assembly 300 may include a lock pin 302 and a panel fastener 304. The lock pin 302 may be inserted into the panel fastener 304 to a first position where the lock pin 302 in axially and laterally retained, and the fastener assembly 300 is retained in a pre-assembled state. The fastener assembly 300 may retain the pre-assembled state until the fastener assembly 300 is installed in an end application, which may unlock the lock pin 302 in a given direction and enable the lock pin 302 to be inserted to a second position within the panel fastener 304. With the lock pin 302 inserted to the second position, the lock pin 302 may be axially and laterally retained and the fastener assembly 300 may be retained in a final assembled state.

In some embodiments, the lock pin 302 may be formed as a unitary component (i.e., manufactured from a single piece of material). In some embodiments, the lock pin 302 may be fabricated from a plastic material. In other embodiments, the lock pin 3024 may be fabricated from one or more pieces or material and/or may be fabricated from a different type of material. In some embodiments, the panel fastener 304 may be formed as a unitary component. In some embodiments, the panel fastener 304 may be fabricated from a metal material. In other embodiments, the panel fastener 304 may be fabricated from one or more pieces or material and/or may be fabricated from a different type of material.

Figure 22:
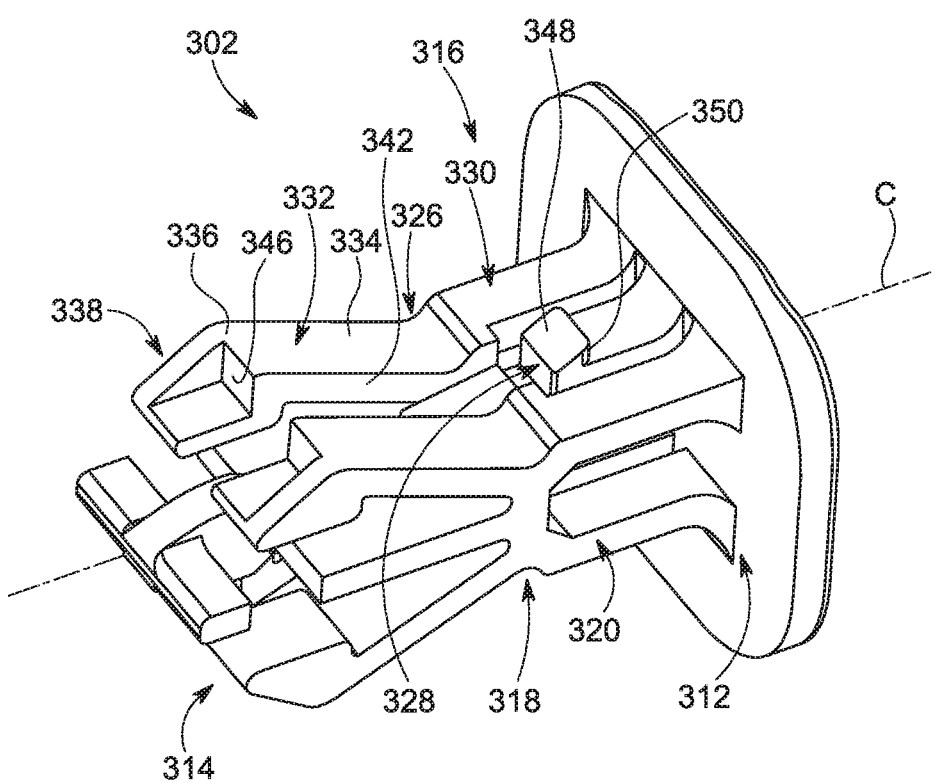
FIG. 22 is a back, top, right isometric view of the lock pin of the fastener assembly of FIG. 21.
Figure 23:
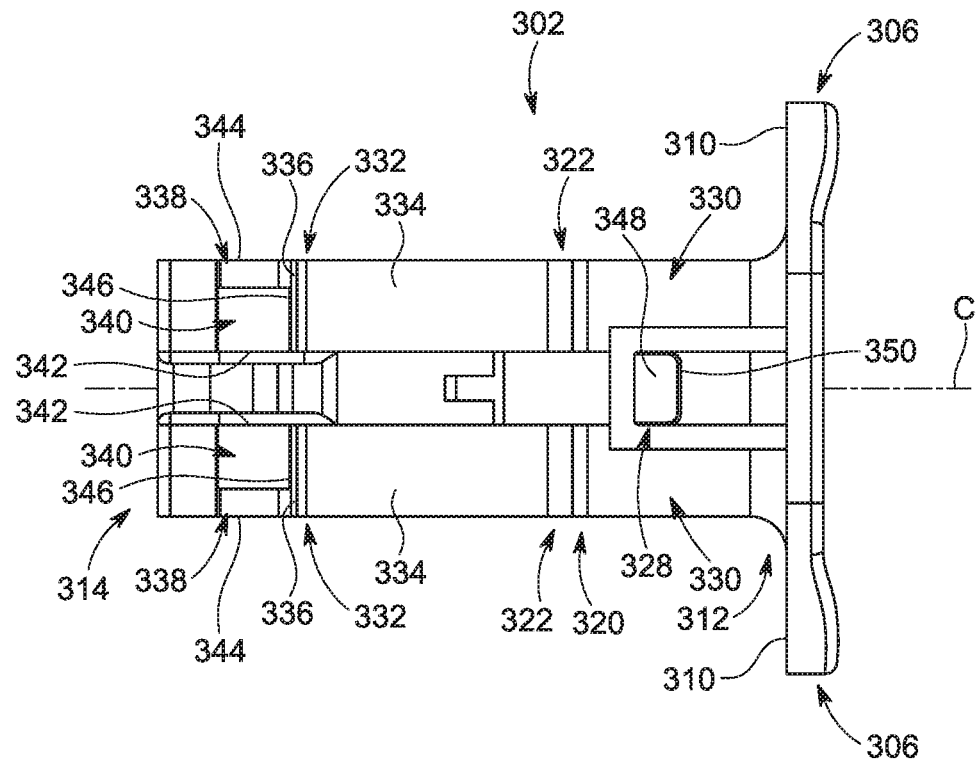
FIG. 23 is a top view of the lock pin of FIG. 22.
Figure 24:
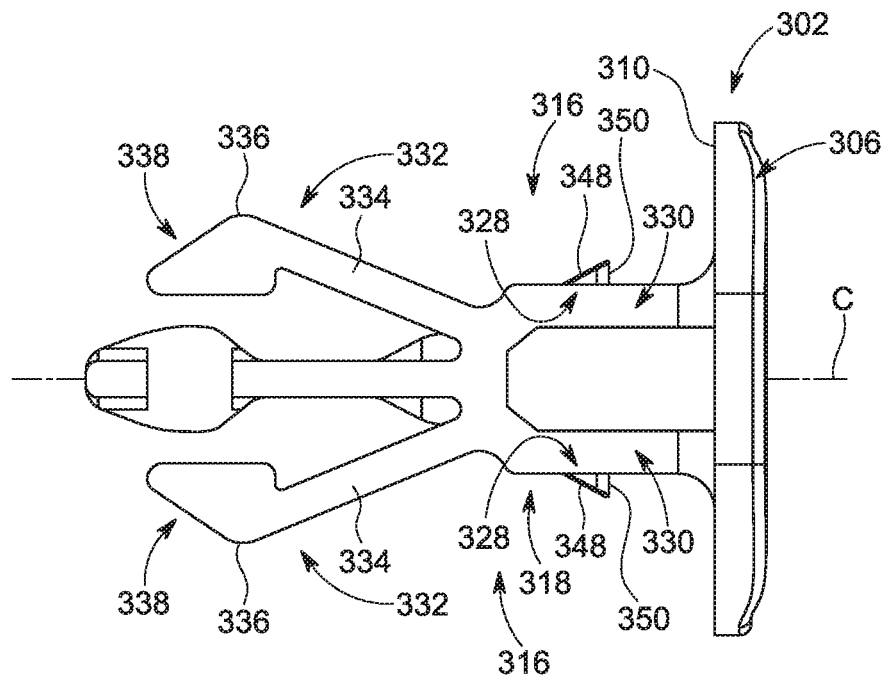
FIG. 24 is a right side view of the lock pin of FIG. 23.

With reference to FIGS. 22-24, the lock pin 302 may include a front panel 306 and a pin body 308 extending outwardly from a back surface 310 of the front panel 306 (e.g., in a direction along the center axis C from the perspective of FIG. 4). In the illustrated embodiment, the pin body 308 of the lock pin 302 and the features thereof may be symmetrical across horizontal and vertical planes that extend through a center of the lock pin 302. That is, the pin body 308 may be symmetrical about a plane that perpendicularly bisects the center axis C in a vertical direction (e.g., from the perspective of FIG. 22) and about a plane that perpendicularly bisects the center axis C in a horizontal direction (e.g., from the perspective of FIG. 22). As such, any description herein of a feature of the pin body 308 applies symmetrically to each corresponding symmetrical feature on the pin body 308.

The pin body 308 may define a first end 312, a second end 314, a first side 316 (e.g., a top side from the perspective of FIG. 22), a second side 318 (e.g., a bottom side from the perspective of FIG. 22), a third side 320 (e.g., a right side from the perspective of FIG. 22), and a fourth side 322 (e.g., a left side from the perspective of FIG. 22). The pin body 308 may extend longitudinally (e.g., in a direction along the center axis C) from the first end 312, where the pin body 308 attaches to the back surface 310, to the second end 314, which longitudinally opposes the first end 312. The first side 316 of the pin body 308 may oppose the second side 318 of the pin body 308, and the third side 320 of the pin body 308 may oppose the fourth side 322 of the pin body 308.

In general, the pin body 308 may include a plurality of retention features that are designed and arranged to retain the lock pin 302 at various positions within the panel fastener 304 during installation and assembly of the fastener assembly 300. In some embodiments, the lock pin 302 may include a plurality of flexible arms 326 and a plurality of retention tabs 328. In the illustrated embodiment, the plurality of flexible arms 326 may include four flexible arms 326, with a pair of flexible arms 326 arranged on the first side 316 and a pair of flexible arms 326 arranged on the second side 318. Each pair of the flexible arms 326 may include a stem portion 330 and a flexible portion 332. Each of the stem portions 330 may extend longitudinally from the back surface 310 of the front panel 306 to a junction between the stem portions 330 and the flexible portions 332. Each of the flexible portions 332 may extend longitudinally from the junction between the stem portion 330 and the flexible portion 332 to the second end 314 of the pin body 308.

In general, each of the flexible portions 332 may be configured to flex inwardly (e.g., in a direction toward the center axis C from the perspective of FIG. 24). For example, vertically aligned pairs of the flexible portions 332 may be configured to flex inwardly toward one another. In the illustrated embodiment, each of the flexible portions 332 may include an angled wall or a pin retention surface 334, a peak 336, and an end portion 338. The angled wall 334 may extend longitudinally from the junction between the stem portion 330 and the flexible portion 332 to the peak 336. The angled wall 334 may angle upwardly (e.g., in a direction away from the center axis C from the perspective of FIG. 24) as the angled wall 334 extends in a direction from the junction between the stem portion 330 and the flexible portion 332 toward the second end 314. In the illustrated embodiment, the peak 336 may define a generally rounded shape. As the flexible portion 332 continues to extend toward the second end 314 from the peak 336, the end portion 338 may angle downwardly (e.g., in a direction toward the center axis C from the perspective of FIG. 24) as the end portion 338 extends in a direction from the peak 336 to the second end 314. In the illustrated embodiment, the end portions 338 may include an arm cutout 340 arranged therein. Each of the arm cutouts 340 may define a recess that extends inwardly into the end portions 338 and extends laterally along a portion of the end portions 338. For example, the arm cutouts 340 may extend laterally from an inner edge 342 of the end portions 338 to a location between the inner edge 342 and an outer edge 344. Each of the arm cutouts 340 may include an end surface 346 that is arranged at a longitudinal location that generally aligns with the peak 336 and extends in a direction substantially perpendicular to the center axis C.

In the illustrated embodiment, each of the end portions 338 may be generally unattached to the pin body 308, other than the attachment to the stem portion 330. In this way, for example, the end portions 338 may be able to flex inwardly during assembly and installation as will be described herein.

With continued reference to FIGS. 22-24, the plurality of retention tabs 328 may include two retention tabs 328, with one retention tab 328 extending outwardly from the back surface 310 of the front panel 306 adjacent to the first side 316 of the pin body 308 and another retention tab 328 extending outwardly from a from the back surface 310 of the front panel 306 adjacent to the second side 318. Each of the retention tabs 328 may extend longitudinally from the back surface 310 in a direction toward the second end 314. The retention tabs 328 may extend from the back surface 310 to a longitudinal location between the junction between the stem portion 330 and the flexible portion 332 of the flexible arms 326 and the first end 312.

Each of the retention tabs 328 may be arranged laterally between a corresponding pair of the stem portions 330. For example, the retention tab 328 arranged on the first side 316 may be arranged laterally between the stem portions 330 arranged on the first side 316. In the illustrated embodiment, each of the retention tabs 328 may include an angled surface 348 and a retention surface 350. The angled surface 348 may taper upwardly from a longitudinal end of the retention tab 328 arranged longitudinally away from the first end 312. Specifically, the angled surface 348 tapers upwardly (e.g., in a direction away from the center axis C from the perspective of FIG. 24) from the end of the retention tabs 328 as the retention tabs 328 extend in a direction toward the first end 312 of the pin body 308. The angled surface 348 may continue to taper upwardly until a junction between the angled surface 348 and the retention surface 350. At the junction between the angled surface 348 and the retention surface 350, the retention surface 350 may extend perpendicularly inward (e.g., in a direction toward the center axis C from the perspective of FIG. 24).

In the illustrated embodiment, each of the retention tabs 328 may be generally unattached to the pin body 308, other than the attachment to the back surface 310 of the pin body 308. For example, a gap may be arranged between each of the retention tabs 328 and the corresponding adjacent pair of the stem portions 330. In this way, for example, the ends of the retention tabs 328 including the angled surfaces 348 and the retention surface 350 may be able to flex inwardly and/or outwardly (e.g., toward and/or away from center axis C from the perspective of FIG. 24) during assembly and installation as will be described herein.

Figure 25:
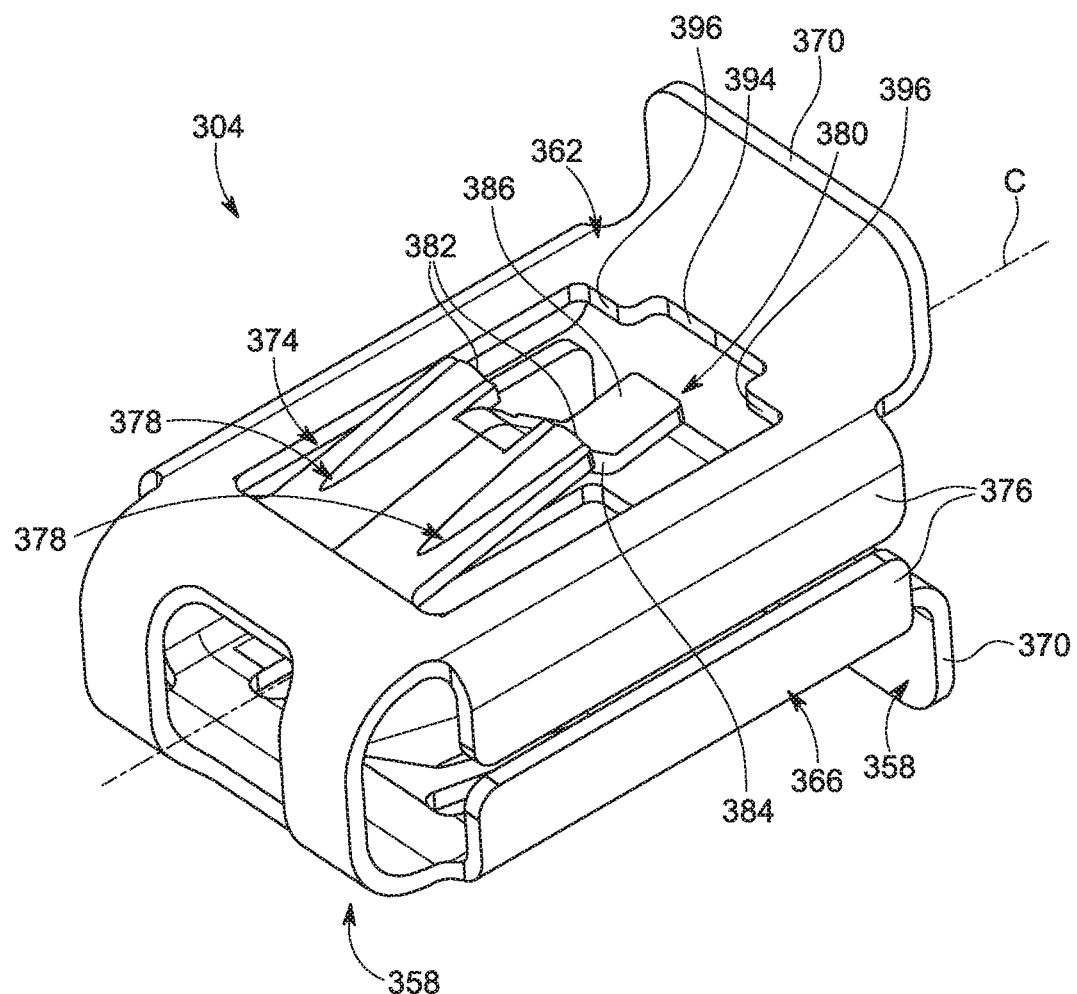
FIG. 25 is a back, top, right isometric view of the panel fastener of the fastener assembly of FIG. 21.
Figure 26:
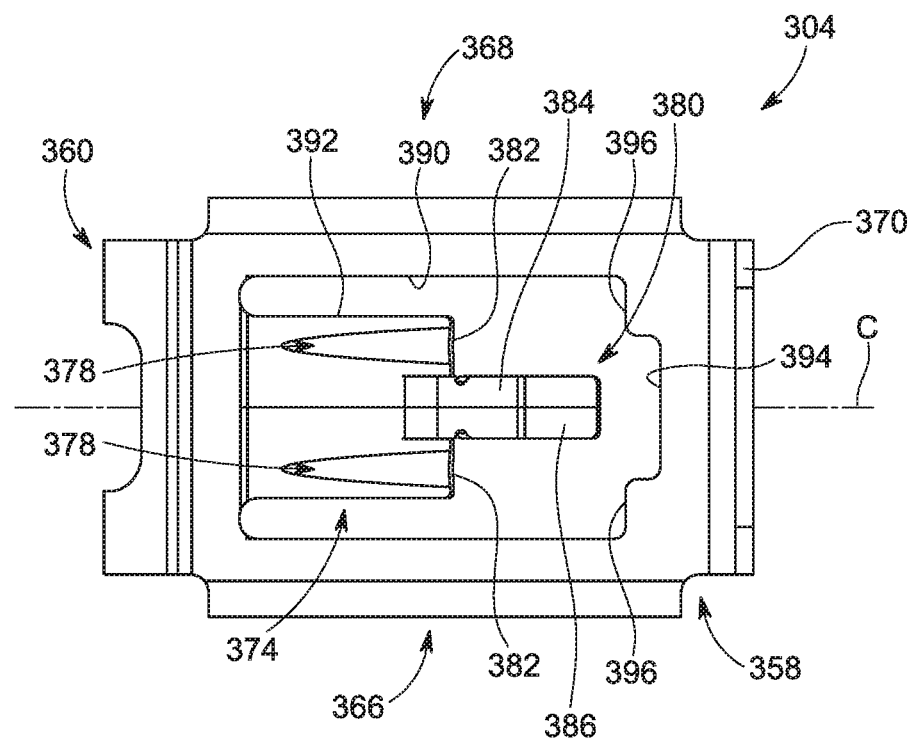
FIG. 26 is a top view of the panel fastener of FIG. 25.
Figure 27:
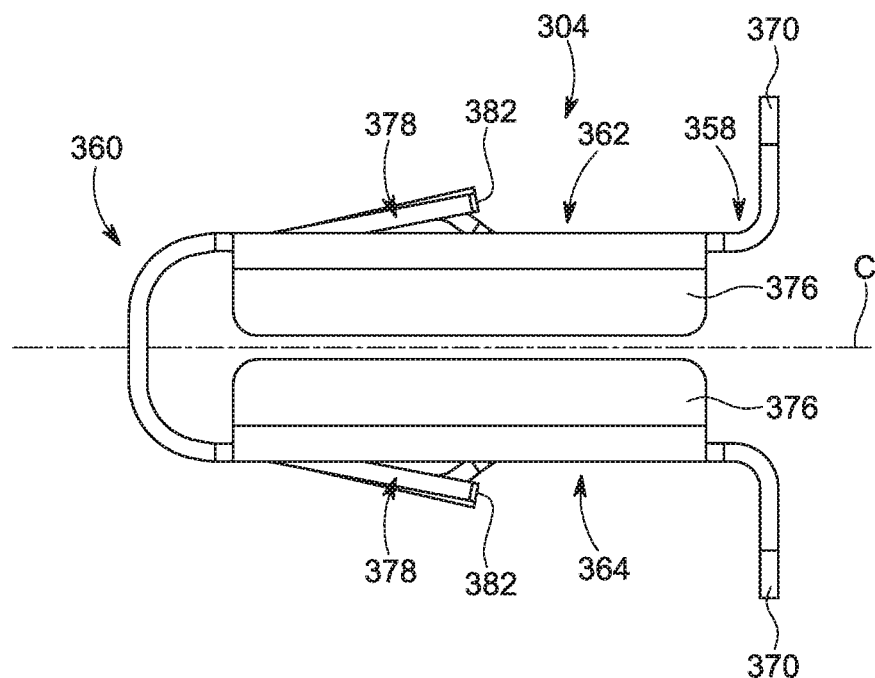
FIG. 27 is a right side view of the panel fastener of FIG. 25.
Figure 28:
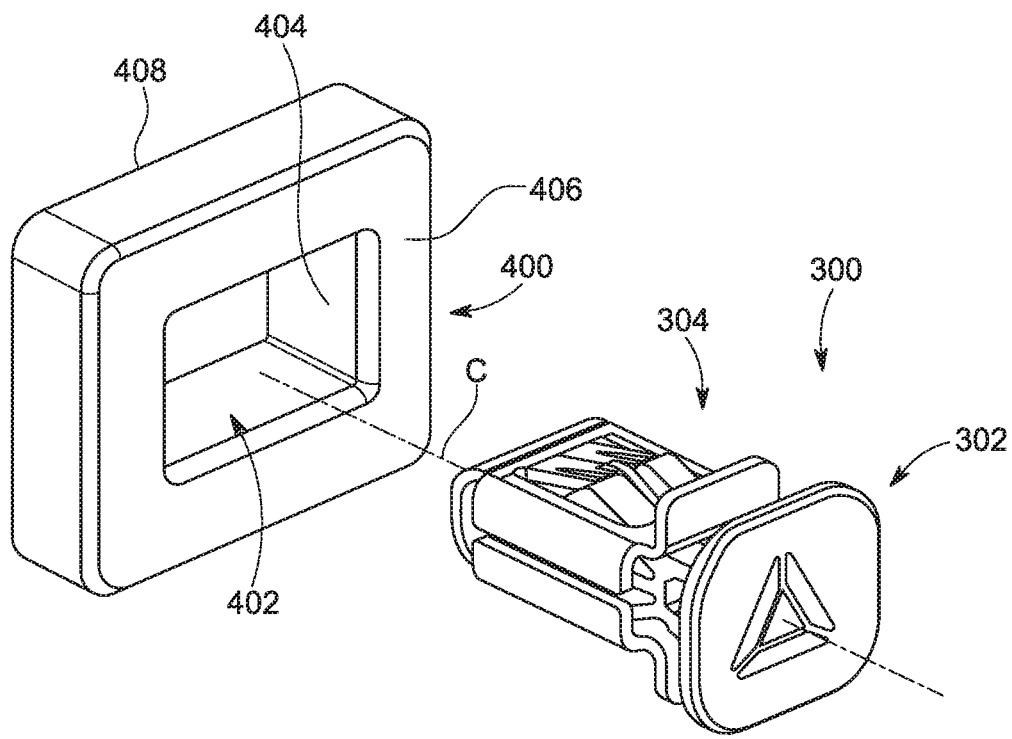
FIG. 28 is a partially exploded top, front, right isometric view of the fastener assembly of FIG. 21 being inserted into a panel.
Figure 29:
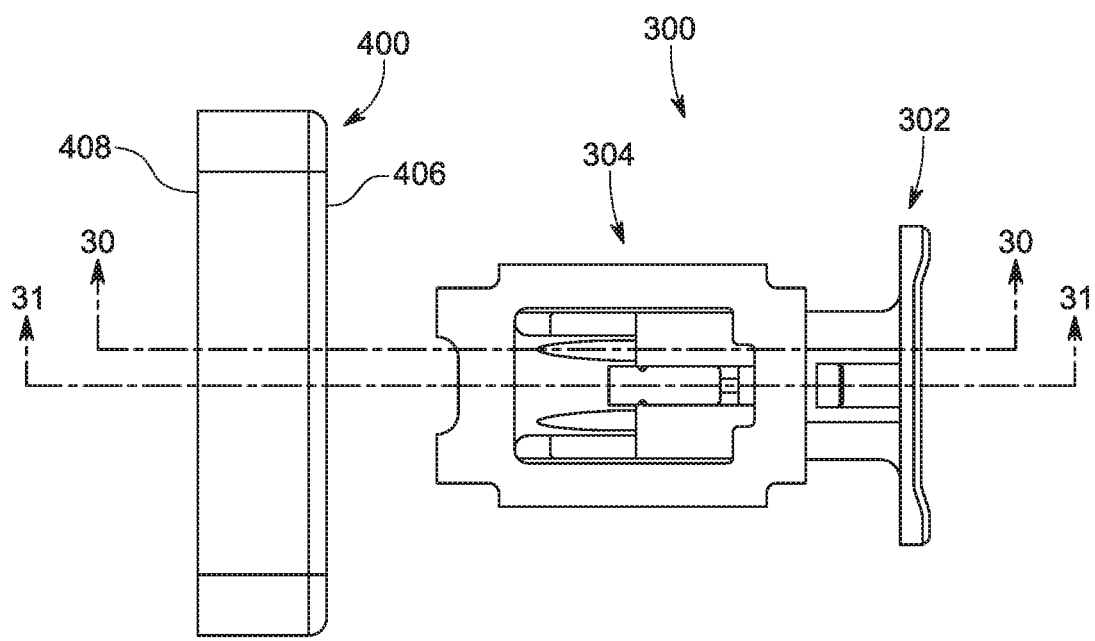
FIG. 29 is a top view of the fastener assembly and the panel of FIG. 28.

Turning to FIGS. 25-27, in the illustrated embodiment, the panel fastener 304 and the features thereof may be symmetrical across horizontal and vertical planes that extend through a center of the panel fastener 304. That is, the panel fastener 304 may be symmetrical about a plane that perpendicularly bisects the center axis C in a vertical direction (e.g., from the perspective of FIG. 25) and about a plane that perpendicularly bisects the center axis C in a horizontal direction (e.g., from the perspective of FIG. 25). As such, any description herein of a feature of the panel fastener 304 applies symmetrically to each corresponding symmetrical feature on the panel fastener 304.

In the illustrated embodiment, the panel fastener 304 may define a first end 358, a second end 360, a first side 362 (e.g., a top side from the perspective of FIG. 25), a second side 364 (e.g., a bottom side from the perspective of FIG. 25), a third side 366 (e.g., a right side from the perspective of FIG. 25), and a fourth side 368. (e.g., a left side from the perspective of FIG. 25) The panel fastener 304 may extend longitudinally (e.g., in a direction along the center axis C) from the first end 358 to the second end 360, which longitudinally opposes the first end 358. The first side 362 of the panel fastener 304 may oppose the second side 364 of the panel fastener 304, and the third side 366 of the panel fastener 304 may oppose the fourth side 368 of the panel fastener 304.

The panel fastener 304 may include one or more front flanges 370 and a body portion 372 that extends generally perpendicularly away from one or more front flanges 370 (e.g., in a direction along the center axis C). In the illustrated non-limiting example, the panel fastener 304 may include two front flanges 370 arranged at the first end 358 of the panel fastener 304, with one of the front flanges 370 extending from the first side 362 in a direction away from the center axis C (e.g., from the perspective of FIG. 27) and another of the front flanges 370 extending from the second side 364 in a direction away from the center axis C (e.g., from the perspective of FIG. 7). In other words, the front flanges 370 may extend away from one another. In the illustrated embodiment, the panel fastener 304 may define a generally rounded junction between each of the front flanges 370 and the body portion 372.

In general, the panel fastener 304 may include a plurality of panel retention features that are designed and arranged to interact with retention features of the lock pin 302 to retain the lock pin 302 at various positions within the panel fastener 304 during installation and assembly of the fastener assembly 300. For example, the body portion 372 may include one or more tabbed portions 374 and a plurality of brackets 376. In the illustrated embodiment, the body portion 372 may include two tabbed portions 374, with one tabbed portion 374 extending from the second end 360 of the panel fastener 304 adjacent to the first side 362 and another tabbed portion 374 extending from the second end 360 of the panel fastener 304 adjacent to the second side 364. Each of the tabbed portions 374 may include a pair of panel retention tabs 378 and an angled arm 380. The tabbed portions 374 may be laterally separated from one another and the angled arm 380 may extend longitudinally toward the first end 358 from between the tabbed portions 374.

In the illustrated embodiment, the pair of panel retention tabs 378 arranged on the first side 362 and the second side 364 may be angled away from the respective one of the first side 362 and the second side 364 (e.g., away from the center axis C from the perspective of FIG. 27). For example, the panel retention tabs 378 may extend longitudinally from the second end 360 in a direction toward the first end 358. As the panel retention tabs 378 extend from the second end 360 toward the first end 358, the panel retention tabs 378 may angle away from the respective one of the first side 362 and the second side 364 (e.g., in a direction away from the center axis C from the perspective of FIG. 27). The panel retention tabs 378 may extend toward the first end 358 to a panel tab end 382.

Each of the angled arms 380 may extend longitudinally toward the first end 358 from between the respective pair of the panel retention tabs 378. Each of the angled arms 380 may include a first angled portion 384 and a second angled portion 386. The first angled portion 384 may be arranged longitudinally between the second end 360 and the second angled portion 386. In the illustrated non-limiting example, the first angled portion 384 may angle in a direction toward the center axis C and the second angled portion 386 may angle in a direction away from the center axis C.

In the illustrated embodiment, the tabbed portions 374 may be attached to the body portion 372 only at the second end 360, and a gap may be formed between the remainder of the tabbed portions 374 and the body portion 372. In other words, the first side 362 and the second side 364 of the body portion 372 may include a cutout 388 defined between an inner edge 390 of the body portion 372 and an outer edge 392 of the tabbed portions 374. A first panel retention surface 394 and a pair of second panel retention surfaces 396 may be defined by the inner edge 390 of the body portion 372 on the first side 362 and the second side 364. The first panel retention surface 394 and the second panel retention surfaces 396 may be arranged adjacent to the first end 358 of the panel fastener 304. The second panel retention surfaces 396 may be arranged longitudinally closer to the second end 360 and laterally outward from the first panel retention surface 394.

With continued reference to FIGS. 25-27, in the illustrated embodiment, the plurality of brackets 376 may include four brackets 376, with a pair of brackets 376 arranged on the third side 366 and a pair of brackets 376 arranged on the fourth side 378. Each pair of brackets 376 may extend generally toward one another (e.g., in a direction toward the center axis C). For example, one of the pair of brackets 376 may extend from the first side 362 in a direction toward the second side 364 and another of the pair of brackets 376 may extend from the second side 364 in a direction toward the first side 362. In the illustrated embodiment, each of the brackets 376 may be arranged adjacent to the first end 358 of the panel fastener 304 and may extend longitudinally from the first end 358 to the second end 360 along the body portion 372.

In general, the brackets 376 may be design to receive the lock pin 302 therein and generally prevent lateral displacement of the lock pin 302 when at least partially received within the panel fastener 304. For example, a lateral width defined between the brackets 376 (e.g., a distance defined between the brackets 376 in a direction perpendicular to the center axis C from the perspective of FIG. 26) may be greater than or equal to a lateral width defined by the pin body 308 to enable the pin body 308 to be inserted into the panel fastener 304.

A non-limiting example of assembly and operation of the fastener assembly 300 will be described with reference to FIGS. 28-39. Looking first to FIG. 28, the fastener assembly 300 may be assembled into a pre-assembled state, for example, for shipping of the fastener assembly 300, where the lock pin 302 is inserted into the panel fastener 304 to a first position. In general, interactions between retention features formed on the lock pin 302 and the panel fastener 304 may hold the lock pin 132 in the first position, which, for example, maintains an orientation and position of the lock pin 302 within the panel fastener 304 until the fastener assembly 300 is installed in an final application (e.g., a panel on a vehicle). In this way, for example, the fastener assembly 300 may maintain a position and orientation of the lock pin 302 during shipping of the fastener assembly 300 to an end user.

Turning to FIGS. 28-32, to assemble the fastener assembly 300 into the shipping configuration, the lock pin 302 may be axially inserted (e.g., along the center axis C) into the panel fastener 304. Initially, the second end 314 of the lock pin 302 may be inserted into the first end 358 of the panel fastener 304 between the front flanges 370. As the second end 314 of the lock pin 302 is inserted further into the panel fastener 304, the end portions 338 of the flexible arms 326 may engage the panel fastener 304 and the flexible portions 332 of the flexible arms 326 may flex inwardly (e.g., in a toward from the center axis C from the perspective of FIG. 30), for example, via the downward angle defined by the end portions 338.

Figure 30:
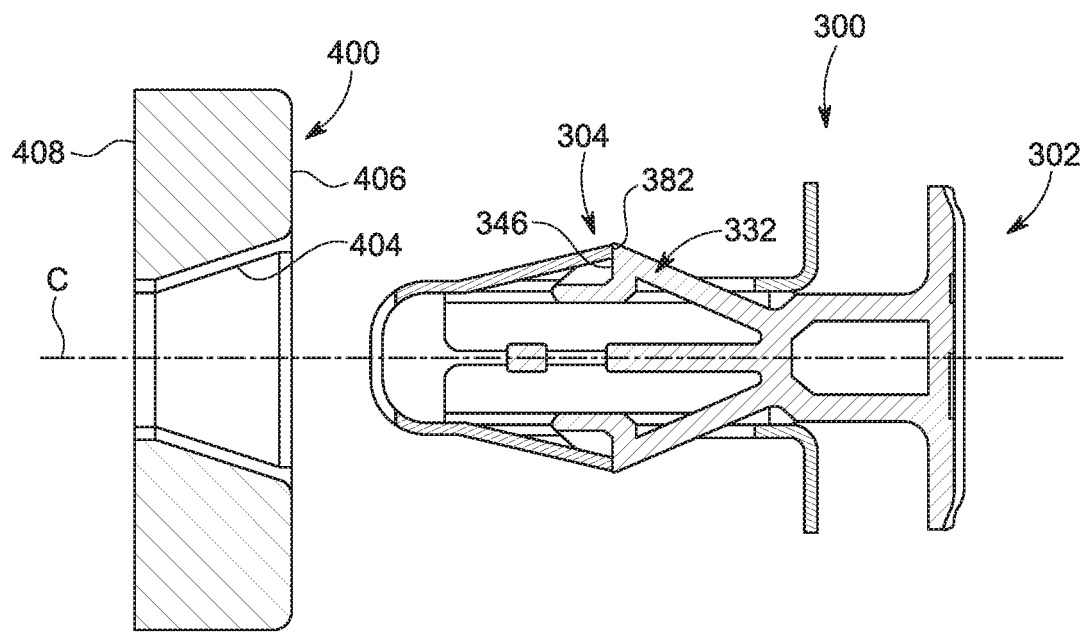
FIG. 30 is a cross-sectional view of the fastener assembly and the panel of FIG. 29 taken along line 30-30.

The flexible portions 332 of the flexible arms 326 may remain flexed inwardly as the lock pin 302 continues to be inserted axially into the panel fastener 304, until the peaks 336 of the flexible portions 332 reach the cutout 388 formed in the first side 362 and the second side 364 of the panel fastener 304. Once the peaks 336 of the flexible portions 332 move past the second panel retention surfaces 396 and reach the cutout 388, the flexible portions 332 may flex outwardly (e.g., in a direction away from the center axis C from the perspective of FIG. 30) and protrude at partially through the cutout 388, as illustrated in FIGS. 30 and 31.

Figure 31:
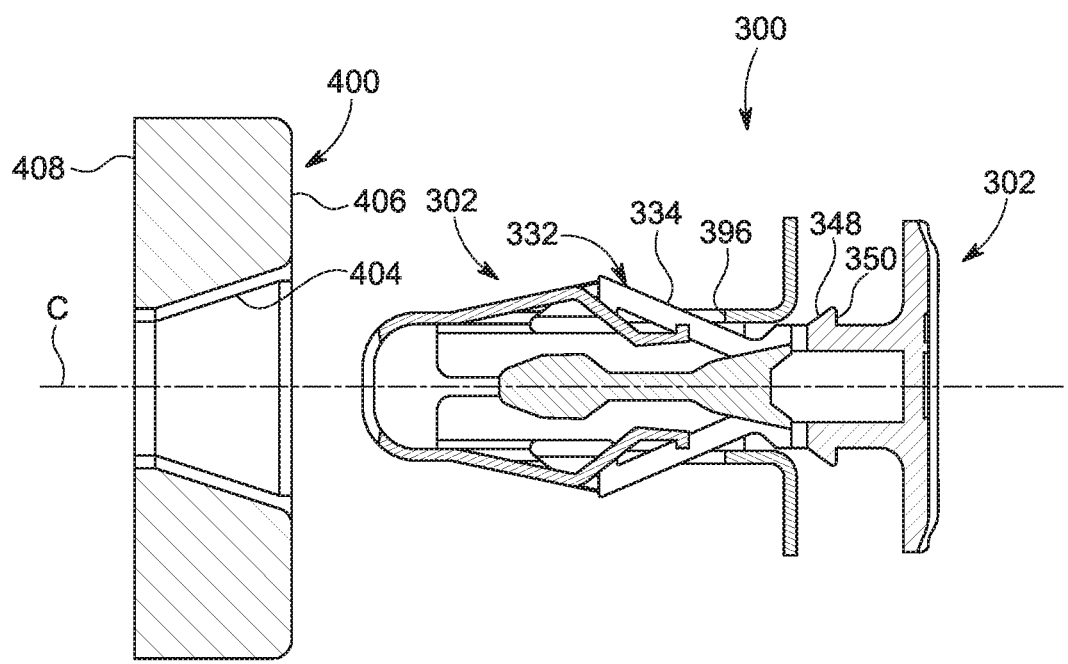
FIG. 31 is a cross-sectional view of the fastener assembly and the panel of FIG. 29 taken along line 31-31.
Figure 32:
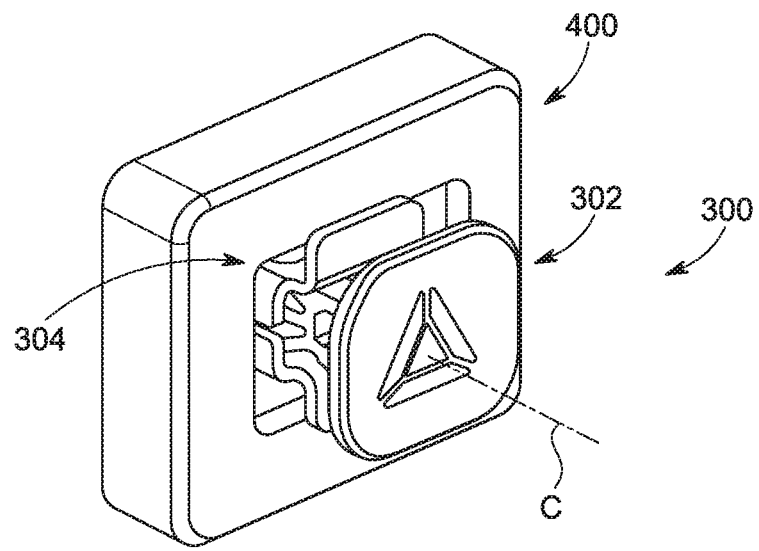
FIG. 32 is a top, front, right isometric view of the fastener assembly of FIG. 21 with the fastener assembly inserted into a panel.
Figure 33:
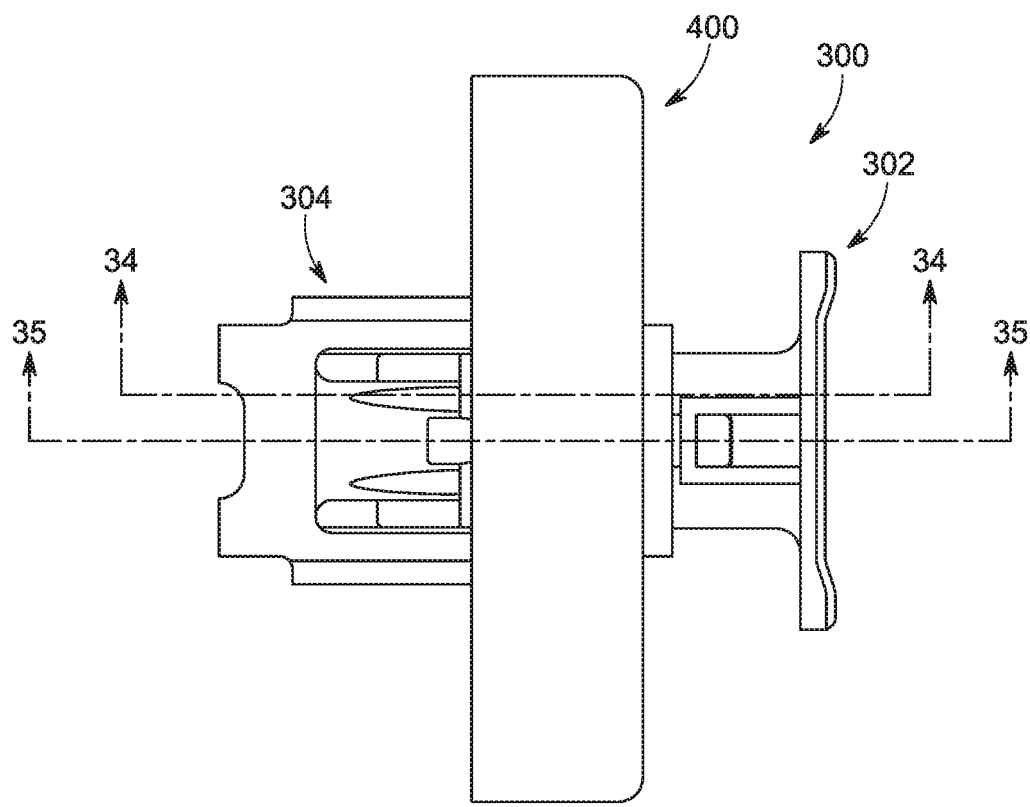
FIG. 33 is a top view of the fastener assembly and the panel of FIG. 32.

With reference to FIGS. 31 and 32, once the flexible portions 332 flex outwardly and extend through the cutout 388, the lock pin 302 may continue to be inserted axially into the panel fastener 304 to a first position where the end surfaces 346 engage the panel tab ends 382 of the panel retention tabs 378. In general, when the lock pin 302 is in the first position, the lock pin 302 may be axially and laterally retained within the panel fastener 304. For example, the panel tab ends 382 of the panel retention tabs 378 may inhibit the lock pin 302 from being inserted further into the panel fastener 304 in a first direction (e.g., axially to the left from the perspective of FIGS. 30 and 31) via engagement with the end surfaces 346 of the flexible portions 332 (see, e.g., FIG. 30). The second panel retention surfaces 396 may inhibit the lock pin 302 from being removed from the panel fastener 304 in a second direction (e.g., axially to the right from the perspective of FIGS. 31 and 32) via engagement with the angled walls 334 of the flexible portions 332 (see, e.g., FIG. 31). As such, the lock pin 302 may be retained axially within the panel fastener 304 when the lock pin 302 is inserted to the first position.

In addition to the axial retention, the lock pin 302 may be retained laterally within the panel fastener 304, for example, via the plurality of brackets 376. That is, the plurality of brackets 376 may inhibit the lock pin 302 from displacing laterally, or rotationally relative to the panel fastener 304. Thus, once the lock pin 302 is inserted into the panel fastener 304 to the first position, the lock pin 302 may be retained axially and laterally, or rotationally, relative to the panel fastener 304. In this way, for example, the general orientation and assembly of the fastener assembly 300 may be maintained to enable the fastener assembly 300 to be shipped to an end user in a consistently assembled state and orientation. This may reduce the an assembly time for an end user, as well as improve the consistency in the end assembly since the fastener assembly 300 may be provided in a pre-assembled state with the lock pin 302 inserted into the panel fastener 304 to the first position.

Once the pre-assembled fastener assembly 300 is shipped to an end user, the fastener assembly 300 may be installed in a given application. For example, the fastener assembly 300 may be installed in high impact force areas on a vehicle, or another structure that requires a fastener to resist fracturing and be retained in a fastened position under both high impact forces and static load forces. In one non-limiting application, the fastener assembly 300 may be installed through a panel 400, for example, on a side curtain airbag assembly on a vehicle. The panel 400 may include a cutout 402 defined by an inner surface 404, which extends through the panel 400 from a first surface 406 to a second surface 408. In the illustrated embodiment, the cutout 402 may define a generally tapered profile, which tapers inwardly (e.g., in a direction toward the center axis from the perspective of FIGS. 30 and 31) as the cutout 402 extends from the first surface 406 to the second surface 408.

To assembly the fastener assembly 300 to the panel 400, the fastener assembly 300 may be inserted axially into the cutout 402 of the panel 400, as illustrated in FIG. 32. Specifically, the cutout 402 may be designed to receive the body portion 372 of the panel fastener 304 therein. As the body portion 372 of the panel fastener 304 is inserted into the cutout 402, the inner surface 404 may slide over the panel retention tabs 378 and the flexible portions 332 of the flexible arms 326. The body portion 372 may continue to be inserted through cutout 402 in the panel 400 past the panel retention tabs 378 to an installed position (see, e.g., FIGS. 34 and 35) where the panel 4200 is arranged between the panel tab ends 382 of the panel retention tabs 378 and the front flanges 370 of the panel fastener 304. When the panel 400 is in the installed position, the panel fastener 304 may axially retain the panel 400 (e.g., substantially inhibit the panel fastener 304 from being removed from cutout 402 without input from an end user or another tool/machine) via the arrangement between the panel tab ends 382 of the panel retention tabs 378 and the front flanges 370.

Figure 34:
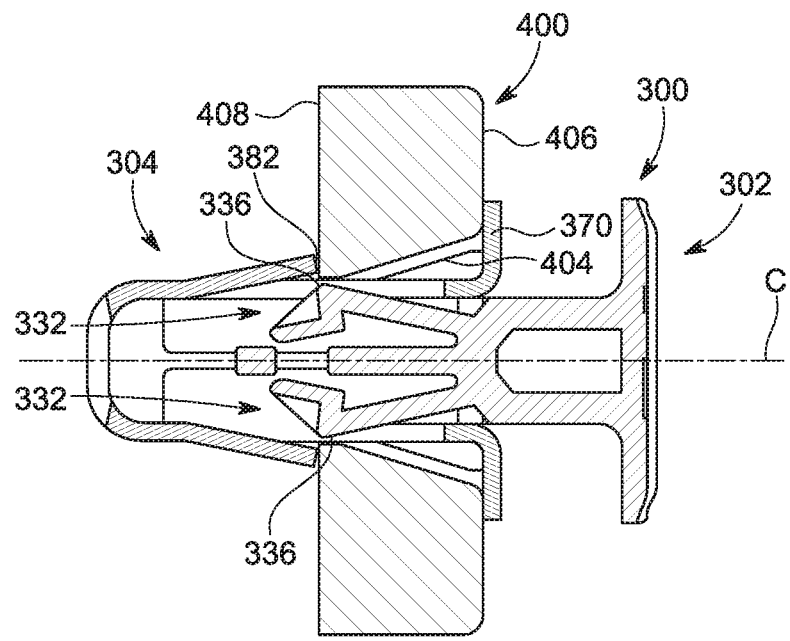
FIG. 34 is a cross-sectional view of the fastener assembly and the panel of FIG. 33 taken along line 34-34.
Figure 35:
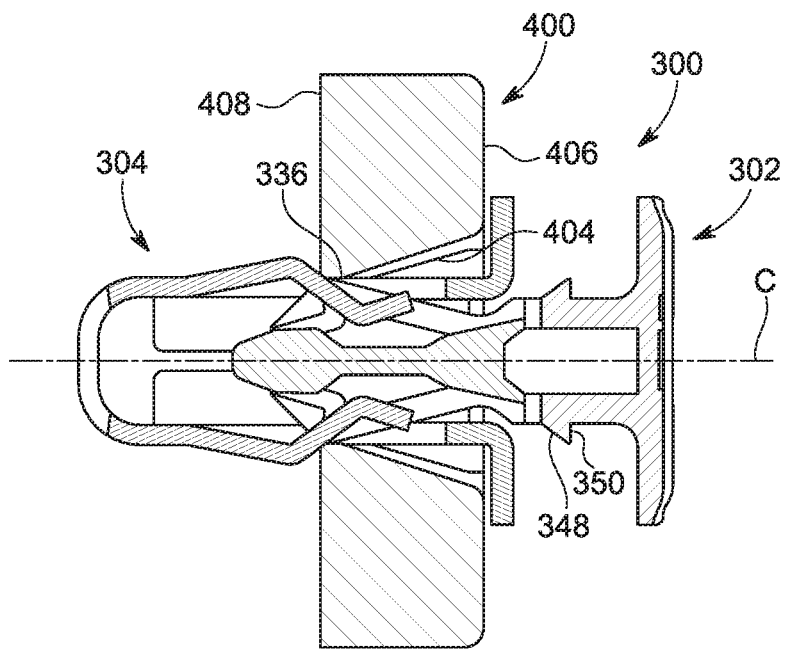
FIG. 35 is a cross-sectional view of the fastener assembly and the panel of FIG. 33 taken along line 35-35.
Figure 36:
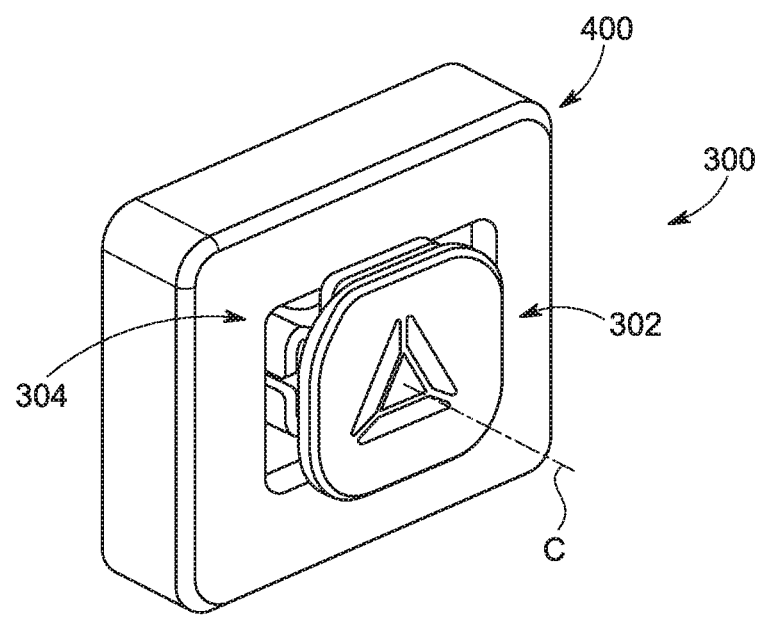
FIG. 36 is a top, front, right isometric view of the fastener assembly of FIG. 21 with the fastener assembly inserted into a panel and the lock pin inserted into the panel fastener to a second position.
Figure 37:
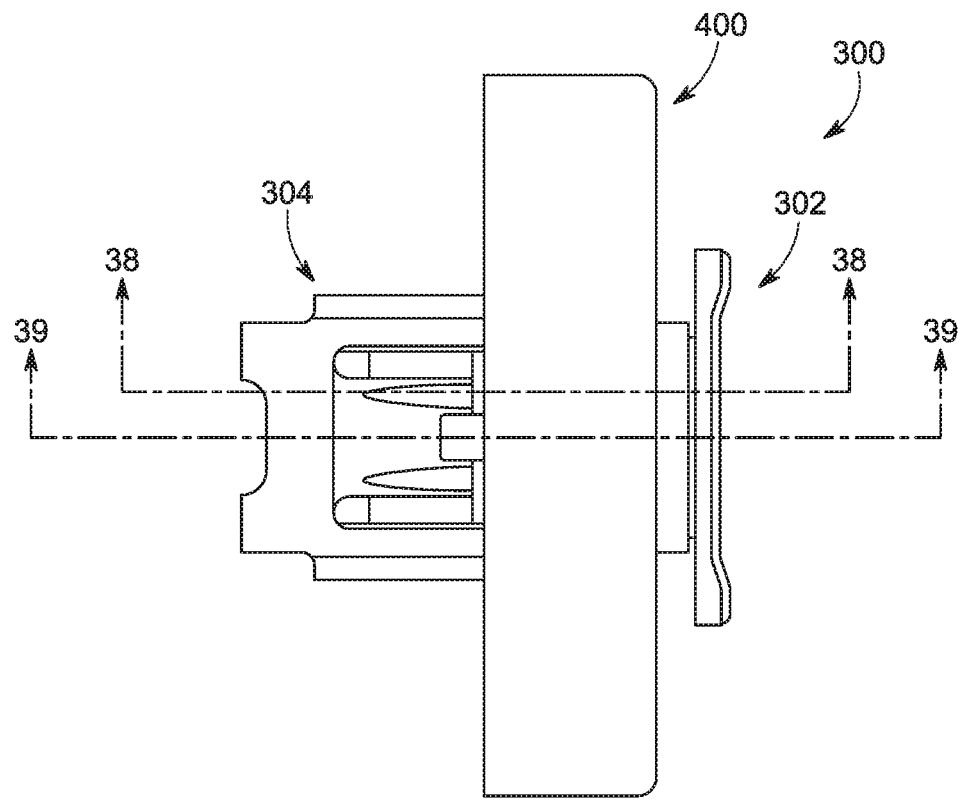
FIG. 37 is a top view of the fastener assembly and the panel of FIG. 36.

With the fastener assembly 300 installed into the panel 400, the inner surface 404 of the panel 400 may engage the peaks 336 of the flexible portions 332 and bias the flexible portions 332 such that the flexible portions 332 flex inwardly (e.g., toward the center axis C from the perspective of FIG. 34), as illustrated in FIG. 34. In general, once the fastener assembly 300 is installed into the panel 400, the lock pin 302 may be unlocked axially in the first direction and may be allowed to be inserted further into the panel fastener 304 to a second position. For example, the end surfaces 346 of the flexible portions 332 may be biased clear of potential engagement with the panel tab ends 382 of the panel retention tabs 378, which may enable the lock pin 302 to be inserted axially further into the panel fastener 304 in the first direction (e.g., axially to the left from the perspective of FIGS. 34 and 35). The lock pin 302 may then be inserted into the panel fastener 304 to a second position, as illustrated in FIGS. 36-39, which may represent a final assembled state of the fastener assembly 300.

Figure 38:
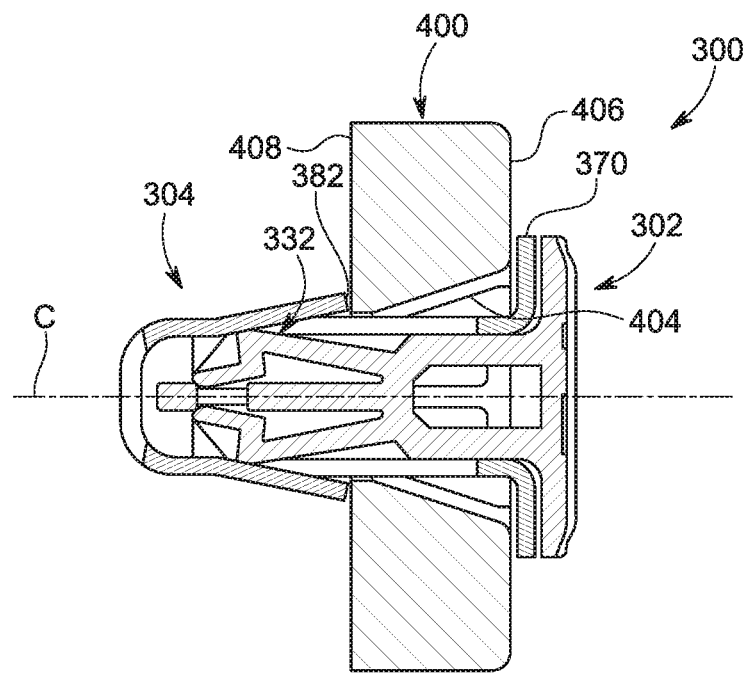
FIG. 38 is a cross-sectional view of the fastener assembly and the panel of FIG. 37 taken along line 38-38.
Figure 39:
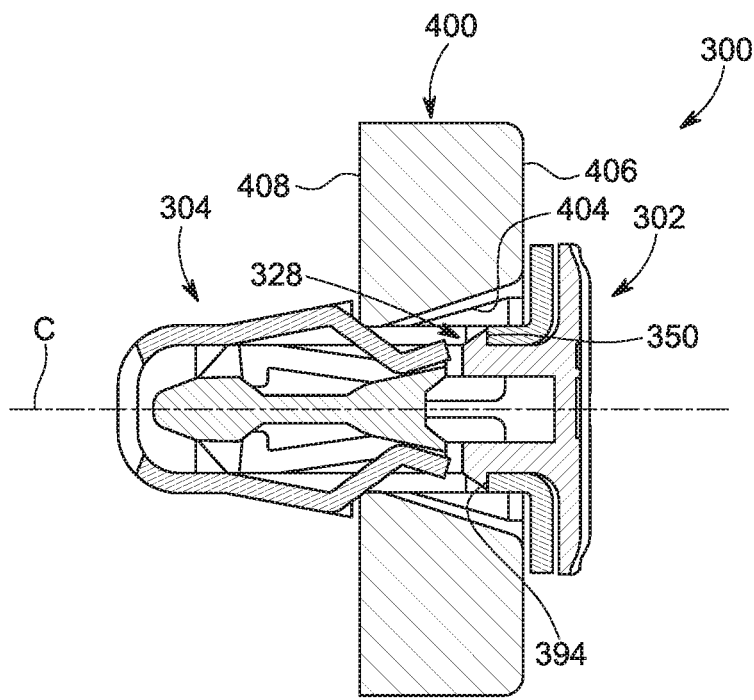
FIG. 39 is a cross-sectional view of the fastener assembly and the panel of FIG. 37 taken along line 39-39.

As illustrated in FIGS. 36-39, when the lock pin 302 is inserted into the panel fastener 304 to the second position, engagement between the front flanges 370 and the back surface 310 of the front panel 306 may inhibit further axial insertion of the lock pin 302 in the first direction. In addition, as the lock pin 302 is inserted from the first position to the second position, the retention tabs 328 may flex inwardly due to engagement with the panel fastener 104 and then flex outwardly once the retention surfaces 350 are displaced past the first panel retention surfaces 394. When the retention tabs 328 flex outwardly, the retention surfaces 350 may engage with the first panel retention surfaces 194, as illustrated in FIG. 38. In this way, for example, the lock pin 302 may be inhibited from being removed from the panel fastener 304 via axial displacement in the second direction (e.g., to the right from the perspective of FIG. 38).

In general, when the lock pin 302 is in the second position, the lock pin 302 may be axially and laterally retained within the panel fastener 304. For example, the front flanges 370 may inhibit the lock pin 302 from being inserted further into the panel fastener 304 in the first direction (e.g., axially to the left from the perspective of FIG. 38) via engagement with the back surface 310 of the front panel 306. The first panel retention surfaces 394 may inhibit the lock pin 302 from being removed from the panel fastener 304 in the second direction (e.g., axially to the right from the perspective of FIG. 38) via engagement with the retention surfaces 350 of the retention tabs 328. As such, the lock pin 302 may be retained axially within the panel fastener 304 when the lock pin 302 is inserted to the second position.

Similar to when the lock pin 302 is in the first position within the panel fastener 304, the lock pin 302 may be retained laterally within the panel fastener 304, for example, via the plurality of brackets 376. Alternatively or additionally, the panel 400 may provide lateral stability to the lock pin 302, and/or the fastener assembly 300 in general. With the lock pin 302 being axially and laterally retained in the second position, the fastener assembly 300 may maintain its final assembled state during both static and dynamic loads applied thereto.

As described herein, the fastener assembly 300 may be assembled into a pre-assembled state where the lock pin 302 is at least partially inserted into the panel fastener 304 to a first position. In this pre-assembled state, the lock pin 302 may be axially and laterally retained within the panel fastener 304 to enable the fastener assembly 300 to be shipped to an end user. The fastener assembly 300 may then be installed into an end application (e.g., into panel 400). Upon installation into the end application (e.g., insertion of the fastener assembly 300 into the cutout 402 of the panel 400), the lock pin 302 may be unlocked axially in a direction that enables the lock pin 302 to be inserted to a second position to transition the fastener assembly 300 to a final assembled state.

In addition to the selective locking and unlocking of the lock pin 302 provided by the design of the fastener assembly 300, the fastener assembly 300 may be assembled via axial insertion of the lock pin 302 into the panel fastener 304, and via axial insertion of the panel fastener 304 and lock pin 302 into an end application (e.g., the panel 400). As such, the fastener assembly 300 may be assembled and installed on an end application without the need for tools and/or rotational motion, which provides a more ergonomically efficient assembly and installation process. Further, the fastener assembly 300 may be removed from the end application (e.g., the panel 400) and disassembled/serviced one or more times without a degradation in the performance and functionality of the fastener assembly 300. That is, the ability of the fastener assembly 300 to retain its position under static and dynamic loads may not be affected by the removal, disassembly, and/or service of the fastener assembly 300.

As described herein, in one non-limiting application, the fastener assembly 300 may be installed in a side curtain airbag assembly on a vehicle. In other non-limiting applications, the fastener assembly 300 may be installed and implemented on other high impact applications on a vehicle or anther on another device/structure.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

I claim:

1. A fastener assembly comprising:
a panel fastener including a panel retention tab, a front flange, a first panel retention surface, and a second panel retention surface, wherein the panel retention tab includes a panel tab end and wherein the panel tab end faces the front flange and is spaced apart from the flange in a first direction;
a lock pin including a flexible arm and a retention tab, wherein the flexible arm includes an angled wall and an end surface and the retention tab includes a retention surface,
the lock pin being insertable into the panel fastener to a first position and a second position, wherein the flexible arm being configured to:
upon insertion of the lock pin into the panel fastener in the first direction to the first position, flex inwardly and then outwardly to bring the end surface into engagement with the panel tab end, the lock pin being axially retained within the panel fastener at the first position via engagement between the end surface and the panel tab end and engagement between the angled wall and the second panel retention surface; and
upon insertion of the lock pin into the panel fastener in the first direction to the second position, flex inwardly to allow the retention tab to pass into the panel fastener to bring the retention surface into engagement with the first panel retention surface, wherein engagement between the retention surface and the first panel retention surface inhibits removal of the lock pin from the panel fastener in a second direction opposite to the first direction,
wherein when the lock pin is inserted into the panel fastener to the first position, the panel fastener and lock pin are insertable at least partially into a cutout formed in a panel, and wherein the panel tab end is configured to engage the panel to inhibit the panel fastener from being removed from the cutout in the second direction.

2. The fastener assembly of claim 1, wherein the panel fastener includes a pair of brackets arranged on laterally opposing sides thereof.

3. The fastener assembly of claim 2, wherein the pair of brackets laterally retain the lock pin within the panel fastener, when the lock pin is in the first position.

4. The fastener assembly of claim 1, wherein the flexible arm includes a stem portion and a flexible portion, the stem portion being attached to a front panel of the lock pin.

5. The fastener assembly of claim 4, wherein the flexible portion includes a tapered wall, a peak, and an end portion, the end portion including the end surface.

6. The fastener assembly of claim 5, wherein the end surface is arranged within a cutout that extends laterally into the end portion from an inner edge thereof.

7. The fastener assembly of claim 5, wherein the angled wall angles outwardly away from a center axis defined by the lock pin as the tapered wall extends in a direction from a first end of the lock pin toward a second end of the lock pin.

8. The fastener assembly of claim 1, wherein the panel retention tab angles away from a center axis defined by the panel fastener as the panel retention tab extends in a direction from a second end of the panel fastener toward a first end of the panel fastener.

9. The fastener assembly of claim 1, whereby insertion of the panel fastener and lock pin into the cutout brings the panel into engagement with the flexible arm to bias the flexible arm inwardly to allow the lock pin to be inserted in the first direction from the first position to the second position.

10. A fastener assembly comprising:
   a panel fastener including a panel retention tab, a first panel retention surface, and a second panel retention surface;
   a lock pin including a pin retention surface, a flexible arm, and a retention tab, wherein the flexible arm includes an end portion having an end surface arranged within a cutout that extends laterally into the end portion from an inner edge thereof, and wherein the retention tab includes a retention surface,
   the lock pin being insertable into the panel fastener to a first position and a second position, wherein the flexible arm being configured to:
      upon insertion of the lock pin into the panel fastener in a first direction to the first position, flex inwardly and then outwardly to bring the end surface into engagement with the panel retention tab, the lock pin being axially retained within the panel fastener at the first position via engagement between the end surface and the panel retention tab and engagement between the pin retention surface and the second panel retention surface; and
      upon insertion of the lock pin into the panel fastener in the first direction to the second position, flex inwardly to allow the retention tab to pass into the panel fastener to bring the retention surface into engagement with the first panel retention surface, wherein engagement between the retention surface and the first panel retention surface inhibits removal of the lock pin from the panel fastener in a second direction opposite to the first direction.

11. The fastener assembly of claim 10, wherein the panel fastener includes a pair of brackets arranged on laterally opposing sides thereof.

12. The fastener assembly of claim 11, wherein the pair of brackets laterally retain the lock pin within the panel fastener, when the lock pin is in the first position.

13. The fastener assembly of claim 10, wherein the panel retention tab angles away from a center axis defined by the panel fastener as the panel retention tab extends in a direction from a second end of the panel fastener toward a first end of the panel fastener.

14. The fastener assembly of claim 10, wherein when the lock pin is inserted into the panel fastener to the first position, the panel fastener and lock pin are insertable at least partially into a cutout formed in a panel.

15. The fastener assembly of claim 14, whereby insertion of the panel fastener and lock pin into the cutout brings the panel into engagement with the flexible arm to bias the flexible arm inwardly to allow the lock pin to be inserted in the first direction from the first position to the second position.

16. The fastener assembly of claim 14, wherein the panel retention tab is configured to engage the panel to inhibit the panel fastener from being removed from the cutout in the second direction.

17. The fastener assembly of claim 10, wherein the end portion of the flexible arm is arranged at a distal end of the flexible arm.

18. The fastener assembly of claim 17, wherein the cutout extends laterally from the inner edge to a location between the inner edge and an outer edge of the end portion.

19. The fastener assembly of claim 18, wherein the cutout extends axially from a peak defined by the flexible arm to the distal end.

20. The fastener assembly of claim 19, wherein the end surface extends into the end portion at a location that aligns with the peak of the flexible arm.

* * * * *